United States Patent [19]

Sekiya et al.

[11] Patent Number: 5,648,652
[45] Date of Patent: Jul. 15, 1997

[54] OPTICAL FOCUS EVALUATION AND FOCUS ADJUSTMENT METHODS, FOCUS EVALUATION AND FOCUS ADJUSTMENT APPARATUS, AND SCREEN APPARATUS

[75] Inventors: Takaomi Sekiya; Moriyasu Shirayanagi, both of Tokyo, Japan

[73] Assignee: Asahi Kogaku Kogyo Kabushiki Kaisha, Tokyo, Japan

[21] Appl. No.: 310,058

[22] Filed: Sep. 22, 1994

[30] Foreign Application Priority Data

| Sep. 22, 1993 | [JP] | Japan | 5-236526 |
| Sep. 22, 1993 | [JP] | Japan | 5-236527 |
| Oct. 22, 1993 | [JP] | Japan | 5-265267 |
| Jun. 20, 1994 | [JP] | Japan | 6-137448 |

[51] Int. Cl.$^6$ .............................................. G01J 1/20
[52] U.S. Cl. .......................... 250/201.7; 250/201.8; 396/150
[58] Field of Search .................... 250/201.7, 201.2, 250/201.8, 201.6, 201.4, 201.3, 216; 354/400–408; 356/141.2, 142, 154, 125, 126; 382/274, 280, 283, 255; 396/79, 80, 150, 151

[56] References Cited

U.S. PATENT DOCUMENTS

| 2,524,807 | 10/1950 | Kallmann | 250/201.2 |
| 3,941,996 | 3/1976 | Stauffer | 250/201.7 |
| 4,963,724 | 10/1990 | Neumann | 250/201.7 |
| 5,055,665 | 10/1991 | Baba et al. | 250/201.7 |

*Primary Examiner*—Que Le
*Attorney, Agent, or Firm*—Greenblum & Bernstein P.L.C.

[57] ABSTRACT

The present invention provides methods and apparatuses to evaluate the best image plane position for an optical lens system, particularly a wide angle lens with a large power ratio, in e.g. an endoscope, in simple and less time consuming procedure. The present devices and methods include a screen which can form an edge image, an optical system which forms an image of the screen, a light receiver located at the focal plane, or in its neighborhood, on which the edge image of the screen is formed by the optical system to convert the edge image into an electric signal, and a sampler which samples the electric signal transmitted from the light receiver in a crossing direction perpendicular to the edge image.

63 Claims, 27 Drawing Sheets

12i  13i  14i 12i  13i  14i (A)    (B)

OPTICAL FOCUS EVALUATION AND FOCUS ADJUSTMENT METHODS, FOCUS EVALUATION AND FOCUS ADJUSTMENT APPARATUS, AND SCREEN APPARATUS

BACKGROUND OF THE INVENTION

1. Field of the Invention

The present invention relates to focus adjustment and focus evaluation methods and apparatuses in which the previously mentioned methods are applied to lens systems, particularly wide angle lenses which have large magnification ratios such as the lens system used in an endoscope.

The present invention further relates to an image sharpness evaluation method, a sharpness evaluation method for focus adjustment, a focus adjustment method and focus evaluation apparatus, and a focus adjustment apparatus.

The present invention further relates to a screen apparatus which is applied to the evaluation and adjustment methods and apparatus.

2. Description of Related Art

Generally, conventional art relates to the examination and evaluation of the focusing conditions or image sharpness of an image forming optical system, such as:

(1) using a screen with slits projected so that the spreading out of the slits can be measured as an indication of an out-of-focus image, (2) a Modulation Transfer Function (MTF) derived from slit images using Fourier transform analysis, and (3) a maximum resolution frequency derived from a repetitive patterned screen applied as evaluation standard parameters.

Using conventional method (1) and (2) it is not possible to distinguish between focusing errors and errors due to the large magnification being used by the optical system (e.g. endoscope).

The above mentioned MTF computation also has difficulties of operational time consumption in the Fourier conversion process and the cost of examination tends to increase dramatically if a high speed computation means is required.

Conventional method (3) requires that the image size of the slit screen is always the same, while the use of different magnifications and different object positions lead to a need to have different slit screens for each permutation of object distance and magnification to be used by the apparatus. Choosing the correct screen for the correct conditions is difficult and obviously complicates the method.

Conventional optical evaluation systems provide other methods such as: MTF values being measured by generating an interference pattern light wave fronts; measuring the diffusion of a point light source or a line light source image; measuring the resolving power; projecting a test screen image in the reversed direction along the optical axes of the apparatus and examining it from the object position. Yet another method for the focal point examination is to introduce a parallel light beam from a collimator onto the focal plane, the light beam corresponds to an object at infinity focus.

In a conventional apparatus, e.g. an endoscope, which has fiber optic bundles and a light receiving element (e.g. CCD), it is found that an overlapping image may be formed due to both the light receiving element and the optical fiber bundle being made from a number of elements. This causes moire interference fringes when measuring the resolving power with a test screen which makes such test results unreliable.

There are many factors that contribute to the generation of moire interference fringes, among these the following factors are major ones:

(A) Interference between a repeated pattern of a screen and the repeated pattern of a fiber optic bundle;

(B) Interference between the light receiving element of the image transmitted by a fiber optics and the repeated pattern of the fiber optic bundle; and (C) Interference between the image signals of the light receiving element and the image, in the case where the image has a repeated pattern.

In addition, the image transmitted through an optical fiber bundle is not formed by light dots within which the transmitting light is at a constant brightness intensity level. The brightness intensity of the light dots of the fiber optical core follow a Gaussian distribution (brightness intensity drops in proportion to the distance from the center of the light dot), and in the surrounding cladding material of the fiber optic, some light leaks through to other fibers causing noise. The data obtained with the above mentioned dot images include the repeated interference patterns of the cores and cladding and the inherent repeated interference noise.

Yet another known optical evaluation and adjustment method for pan-focus optical systems, such as an endoscope, is to use a collimator and a screen. The screen is placed at the nearest and farthest distances expected, for the given application, and the system is adjusted to give the same amount of defocus at the two extremes. The collimator produces parallel rays incident upon the objective lens.

In still another conventional test method, a screen is moved to various object distances and the focusing accuracy and other optical performances are tested by observing the images formed on a light receiving element by the object of evaluation at points corresponding to different object distances.

The previously mentioned method which utilizes parallel rays, cannot evaluate the focusing positions or optical performances of objects placed at close focusing distances.

The moving screen method mentioned above has further drawbacks, such as a long test time required, and unstable test results, as there are screen positioning errors in distance and inclination at each test position.

A resolving power test screen, which has three or more slits, has yet other difficulties. When positioned at the various object distances, the image magnification also varies. To maintain the same image size on a surface of the light receiving means, various sized screens must be provided to allow a choice corresponding to the image magnification. Conventionally, the images of several screens cannot be formed on the surface of the light receiving means simultaneously and therefore the screen must be replaced at each test sequence.

The above-described conventional methods are obviously not suitable where precise focusing and optical image quality is required, such as in the case of an endoscope where an object is placed from a few millimeters to around ten centimeters, or a compact camera where the distance to the object is from around ten centimeters to infinity, or as in a security camera where the distance to the image is from a few meters to tens of meters.

Further, using the above-described focusing adjustment methods, a good compromise in the image quality in terms of the object distance cannot be made. For example, in one case, the image quality is more than satisfactory at a far object distance while the image quality is not acceptable at a close object distance. In another case, a reversed phenomenon can be observed wherein the image quality is better than required at a close distance while the image quality at a far distance is not acceptable.

The amount of defocusing of an out of focus image changes with a change in the image magnification. An out of focus image having a low magnification looks less significant than an out of focus image having a high magnification at a far distance.

An endoscope, applied in the medical field in a large number of applications, for example, observations of the esophagus, stomach, intestines or other digestive organs, requires precise focus from a few centimeters to over ten centimeters, while the endoscope used in, for example, the observation of lungs and bladders, requires a good focus for only a few millimeters but is not required at all to have good focus at more than a few centimeters.

The focusing and optical performance is subjectively judged by the medical doctors who use such apparatus, and therefore, the conventional far and close focus balance, in which the amount of out-of-focus at the image plane appears similar regardless of the object distance, does not necessarily satisfy the apparatus users.

Optical focus adjustments and image evaluation methods, which are well known, use a method in which the focus is adjusted against a collimator which provides parallel rays and moving screens.

Unfortunately, this method using parallel rays can not evaluate the focus position or the image quality for close object distances. The moving screen method takes a long time for evaluation and spatial and angular errors in positioning the moving screen cause a low consistency in repeated precise testing.

In the case of a resolving power test screen, which uses screens with multiple lines and patterns, the image magnification changes as the object distances change. To obtain the same size of image at the light receiving element, a number of different sized screens must be provided and an appropriate one should be selected for each test. Moreover, in the conventional systems, screens are chosen for standard test distances which are not necessarily relevant to the actual users preferences, and because of such testing methods the focusing point and image quality is not at the user's preferred position.

Yet another difficulty of the conventional evaluation methods, is the applicability of standard evaluation test methods to apparatus which has optical performances well outside the standard testing range.

SUMMARY OF THE INVENTION

In view of the above-described circumstances, one major object of the present invention is to provide an evaluation method and an evaluation apparatus to obtain a focused image through simple procedures and methods and apparatus and evaluation taking a short period of time.

Another object of the present invention is to provide an evaluation method for an optical system which uses a repeated pattern, despite which takes a short time to evaluate.

Yet another object of the present invention is to provide a screen apparatus which can provide a simple and precise optical focus adjustment and an examination of the image quality of an optical system at a plurality of various object distances.

Still another object of the present invention is to provide a focus adjustment method and a focus adjustment apparatus which allows the adjustment of the optical system to be made for particular users by simple procedures at their request.

Still another object of the present invention is to provide a focus evaluation method and focus adjustment method which derive overall evaluation values not from the direct values obtained from each screen but through predetermined arithmetic operations of multiple evaluation values.

In order to achieve the above-described objects, the present invention includes a screen element which can form an edge image, an optical system which forms an edge image of the screen element on an image forming plane, a light receiver aligned such that the edge image from the screen element generates an electric signal, and a sampler which samples the electric signal transmitted by the light receiver in a direction perpendicular (i.e., transverse to the line image) to the edge image.

According to another aspect of the present invention, an image forming process includes an edge image of a screen element formed by an optical system, a sampling process includes a signal of an intensity distribution of a light brightness sampled in a direction perpendicular to the edge image (i.e., transverse to the line image), and an arithmetic operation includes a line spread function (LSF) derived from taking a differential of the sampled signal of the distribution of the intensity of the brightness of the light in the sampling direction (i.e., perpendicular to the edge image).

According to another aspect of the present invention, an image forming process is provided wherein an edge image of a screen element is formed on a light receiving means, a sampling process wherein a distribution of the intensity of brightness of the light is sampled in a direction perpendicular to the edge image, the image position is evaluated by an output signal of the light receiving means by placing screens in one or more pairs of positions in the object zone. The pair of points are in line with two image points located at the same distance in front and in back of an expected best image position in the image zone.

According to another aspect of the present invention, an image position evaluation apparatus which is an evaluating system includes a number of symmetrically arranged optical elements further including a screen apparatus which forms an edge image, a light receiver positioned on a plane where the edge image of the screen apparatus is formed by an optical system, and an operating system which carries out a predetermined computation operation based on an output of the light receiver.

According to still another aspect of the present invention, an optical evaluation method, including an optical element with a periodic arrangement, includes a process for an image of a chart apparatus having a one-dimensional brightness contrast formed by an optical system on a plane, or in the neighborhood of the plane, of a light receiver, a process for an image of the chart apparatus taken in by said light receiving means equalized in order to obtain a one-dimensional gradient of said brightness contrast progress, a process for a specified arithmetic operation is conducted based on said one-dimensional data.

According to still another aspect of the present invention, a number of screen elements are provided at different distances within an object distance. Further, an optical system under examination forms images of each screen element at different positions on observation planes located at specific distances simultaneously.

According to still another aspect of the present invention, a process is provided in which one or more chart elements are positioned at different object distance ranges of an optical system, a process in which the image of each above mentioned chart element is formed on a light receiver positioned at, or in the neighborhood of, the focal plane of the optical system, a process in which an image of a chart element is formed on a light receiver positioned on the focal plane, or in the neighborhood of, the optical system, and a process in which an evaluation value of the image of each chart element formed on a light receiver relative to a predetermined objective value of the image of the chart element formed on the light receiver positioned at different object distance.

According to still another aspect, the present invention includes a process in which one or more screen elements are positioned at different object distances of an optical system; a process in which an image of the screen element is formed on a light receiver positioned at the focal plane of the optical system; a process in which an image of the screen element is formed on a light receiver positioned on the focal plane of the optical system; and, a process in which an evaluation value of the image of each screen element formed on the light receiver relative to a predetermined objective value of the image of the screen element is formed on the light receiver positioned at different object distances.

According to still another aspect, the present invention includes a process for forming an image of each screen element on a light receiver positioned at the focal plane of the optical system. A focus evaluation process in which an evaluation value of an image of each screen element is formed on the light receiver is computed relative to a predetermined objective value of each screen element image formed on the light receiver. A focus adjustment process in which the focus point of an optical system being examined is adjusted based upon the objective evaluation value and a computed evaluation value.

According to still another aspect of the present invention, a screen element is positioned at a plurality of object distances for an optical system being examined. A light receiver is positioned on a focal plane of the optical system, a computer is provided for quantifying an out-of-focus image for each screen image formed on the light receiving means, and, a focus adjuster adjusts a focal point of the optical system being examined to coincide with an outputted quantity of out-of-focus image for each screen element to a predetermined objective value.

According to still another aspect of the present invention, a process for conversion of images of more than N number of screen elements (wherein N is an integer larger than 2) is positioned within a specific region on both sides of the best focus object position of an optical system being examined by formation into electrical data. A process to compute evaluation values, yn (n=1 to N), of image sharpness for each screen element based upon the electrical data and, a process to compute an actual overall evaluation value "S" by a mathematical function;

$$S=g(y1, y2, \ldots, yn, \ldots, yN)$$

from the N number of evaluation values yn are provided.

According to still another aspect of the present invention, a process to convert images of a screen element located at a distance closer than the expected best focus object distance and a screen element located at a distance further than the expected best focus object distance of an optical system being examined is provided. An intermediate screen element located between the two screen elements formed by the optical system being examined, as well as a process to compute evaluation values y1, y2 and y3 of image sharpness of each screen element based upon the electrical data is provided. Also provided is a process to compute an actual overall evaluation value S by a mathematical function $$S=g(y1, y2, y3)$$

from the three (3) evaluation values y1, y2 and y3.

According to still another aspect of the present invention, a process to convert images of more than N number of screens (wherein N is an integer larger than 2) positioned within a specific region on both sides of the best focus object distance of an optical system being examined by formation into electrical data is provided. A process to compute evaluation values yn (n=1 to N) of image sharpness of each screen element based upon the electrical data, a process of varying a focusing condition by a quantitative unit x of the focus adjustment, a process to express the focus evaluation values "yn" in a form of the mathematical function;

$$yn=fn(x)$$

where x is a quantitative unit of the focus adjustment, a process to compute an actual overall evaluation value "S" by the mathematical function;

$$S=g(y1, y2, \ldots, yn, \ldots, yN)$$

and, a process to compute a focus adjustment objective value $x_o$ which satisfies a predetermined standard overall evaluation value "So" from the mathematical functions "fn" and "g", and, focus evaluation values "yn" and the actual overall evaluation value "S" are provided.

According to still another aspect of the present invention, the invention provides a process to convert a plurality images of a screen element located at a closer distance than the expected best focus object distance and a screen element located at a distance further than the expected best focus object distance of an optical system being examined, and an intermediate screen element located between the two screen elements formed by the optical system being examined, a process to compute evaluation values y1, y2 and y3 of image sharpness for each screen element based on the electrical data, a process to vary a focus condition by a focus adjustment quantitative unit x; a process in which the focus values y1, y2 and y3 are expressed by a mathematical function of a focus adjustment quantitative unit x given by;

$$y1=f1(x)$$

$$y2=f2(x)$$

$$y3=f3(x),$$

a process to compute an actual overall evaluation value "S" by the formula;

$$S=g(y1, y2, y3)$$

based on the three focus evaluation values y1, y2 and y3; and, a process to compute a focus adjustment objective value $x_o$ which satisfies the standard overall evaluation value "$S_o$" based on the mathematical functions f1, f2, f3 and "g", the focus evaluation values y1, y2 and y3 and the actual overall evaluation value "S".

According to still another aspect of the present invention, N number of screen elements (wherein N is an integer larger than 2) are positioned within a specific region, on both sides of the best focus object distance, of a subjected optical system being examined. A converter is provided whereby images of each screen element formed by the optical system being examined are converted into electrical data, and, a process to compute evaluation values yn (n=1 to N) of image sharpness of each screen element based on the electrically converted data, and to compute an actual overall evaluation value "S" by a mathematical function, S=g(y1, y2, ..., yn, ..., yN)

are provided.

The present disclosure relates to subject matter contained in Japanese patent application Nos. 05-236526, 05-236527 (both filed on Sep. 22, 1993), No. 05-265267 (filed on Oct. 22, 1993) and No. 06-137448 (filed on Jun. 20, 1994) which are expressly incorporated herein by reference in its entirety.

DETAILED DESCRIPTION OF THE PREFERRED EMBODIMENTS

Figure 1:
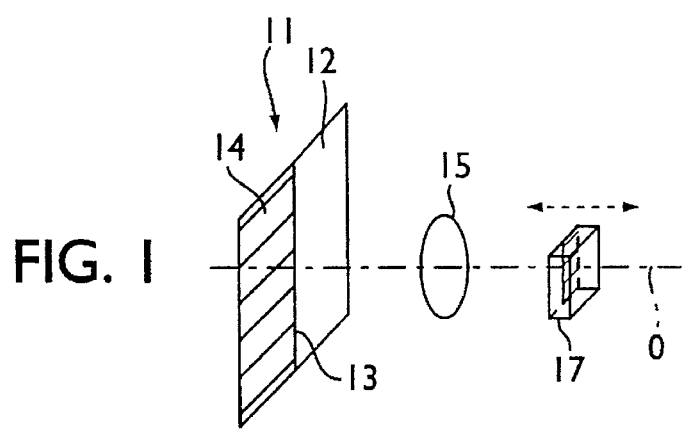
FIG. 1 is a schematic perspective view of an embodiment of an optical arrangement of the subjected optical system to the evaluation by the image plane position evaluation method provided by the present invention.

The embodiment of the present invention, an optical focus evaluation and focus adjustment methods, focus evaluation and focus adjustment apparatus, and screen apparatus, will be discussed below.

With reference to FIG. 1 to FIG. 7 the embodiment of an optical apparatus wherein an image position evaluating method applies in accordance with the present invention will be described. The optical system in relation to this embodiment includes optical elements which do not change relative positions to each other in normal applications.

A screen 11, which can form an edge image by an image forming optical system, comprises a light area 12 and dark area 14 on its surface and the light and dark areas are separated by a straight edge border line 13. The screen 11 is positioned on the image forming side of the optical system 15 perpendicular to the optical axis O and coinciding with the center of the edge line 13 with the optical axis O. An image sensor 17 is positioned on the image forming side of the image forming optics and an image of the screen 11 (called the screen 11i hereinafter) is formed on the image sensor 17. The screen image 11i is an inverted image and the edge image 13i (an image formed by the border between the image 12i of the light area 12 and the image 14i of the dark area 14) is formed through the optical axis O. The focus is adjusted in this arrangement by moving the image sensor 17 along the optical axis. The image sensor in accordance with this embodiment is a sensor plate wherein a plurality of photoelectric transducer elements are aligned in a matrix arrangement, such as a CCD sensor plate, but not limited by one type of sensor, and can be replaced by a line sensor.

Figure 13:
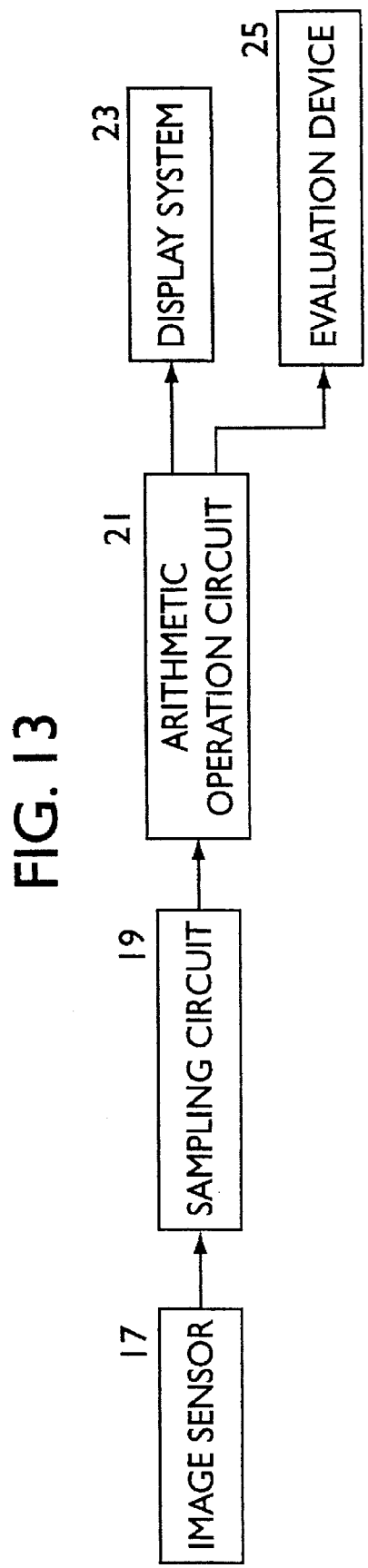
FIG. 13 is a schematic block diagram of a circuit arrangement of the present invention.

The image sensor 17, shown in FIG. 13, converts the screen image into an electric signal. The electric signal is read by a sampling circuit 19, computed to derive an evaluation value by an arithmetic operation means 21 through a predetermined arithmetic operational process and then, the results are displayed on a display system 23 in the form of numerical or graphic expressions. Following the above-described processes, a best image position and other factors are evaluated by an evaluation means 25 with an evaluation method described later. A personal computer, a work station and other computing means can be applied as the arithmetic operational means and the evaluation means. Incidentally, the display of the computation results can be done with a printer by printing out the results and the evaluation of the subjected optics, or the examination can be done by an apparatus operator comprehending the evaluation values.

Figure 2:
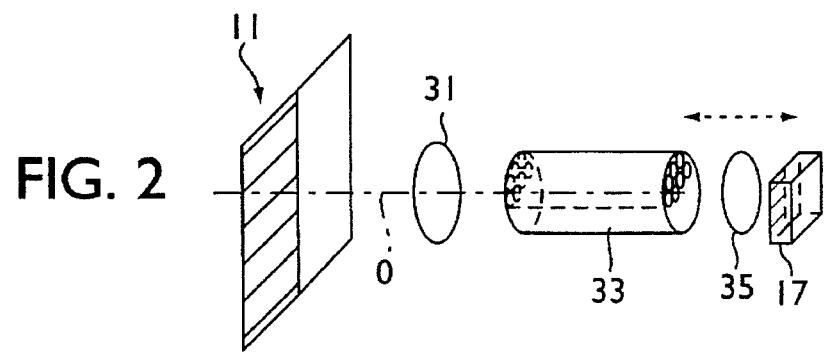
FIG. 2 is a schematic perspective view of an embodiment of an optical arrangement of the subjected optical system to the evaluation by the image plane position evaluation method provided by the present invention.

FIG. 2 shows an embodiment wherein the present invention is applied to an optical apparatus having a bundle of optical fibers 33. In this embodiment, an inverted real image of a screen 11 is formed on a plane of light incident on the optical fiber bundle 33 by a first image forming optics 31 and the inverted real image transmitted from the optical fiber bundle 33 is further formed on an image sensor 17 as an erected image by a second image forming optics 35. A focusing operation in this embodiment is done by adjusting the distance between the first image forming optics 31 and the optical fiber bundle 33 and the distance between the optical fiber bundle 33 and the second image forming optics 35 is unchanged.

Figure 3:
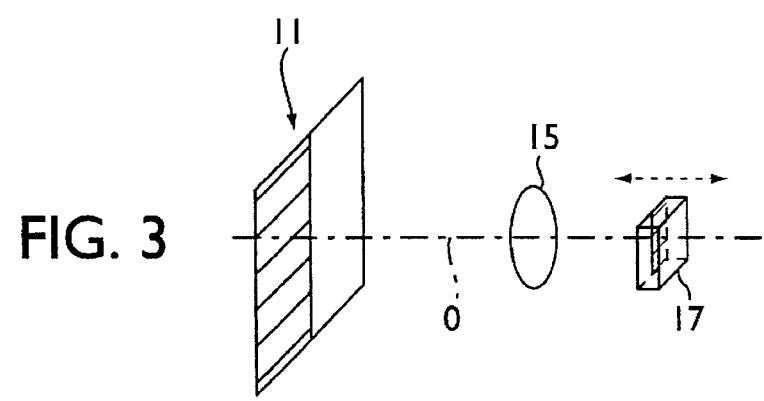
FIG. 3 is a schematic perspective view of an embodiment of an optical arrangement of the subjected optical system to the evaluation by the image plane position evaluation method provided by the present invention.
Figure 4:
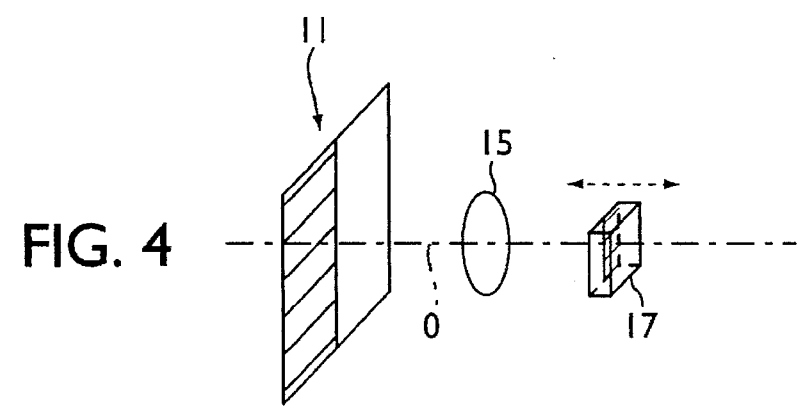
FIG. 4 is a schematic perspective view of an embodiment of an optical arrangement of the subjected optical system to the evaluation by the image plane position evaluation method provided by the present invention.

FIG. 3 and FIG. 4 show a status of the apparatus wherein the apparatus is applied in the observing or photographing of an object located within a specific object distance region. A screen 11 is positioned, in this embodiment, at the furthest distance of the object space and another screen 11 is positioned at the closest distance of the object space as under normal observation. An image sensor 17 is moved to adjust the focus in this arrangement. The screen image 11i formed on the image sensor 17 shown in this embodiment is an inverted real image, as discussed with regard to FIG. 1, wherein the edge image passes through the optical axis O. If, in this case, the circumference of the screen image is larger than the image sensor 17, the edge images of the far distance and the close distance formed on the image sensor are practically the same except the degree to which they are out-of-focus. Therefore, the same screen 11 can be applied in the case of the embodiment shown in FIG. 3 and FIG. 4. In other words, regardless of focal length or image magnification of the subjected optical system for the examination, the same screen element can be used for evaluation.

Figure 5:
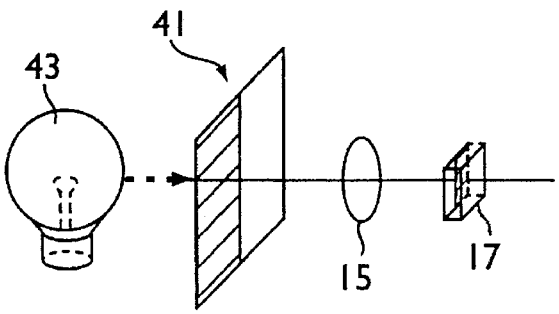
FIG. 5 is a schematic perspective view of an embodiment of a screen applied in practice of the present invention.
Figure 6:
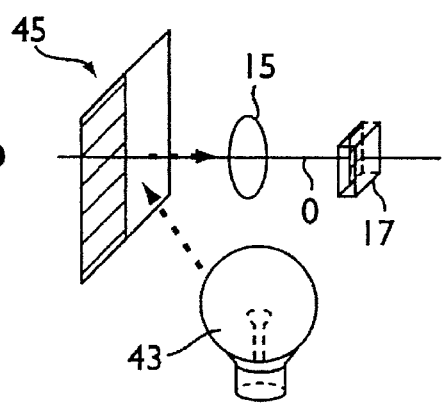
FIG. 6 is a schematic perspective view of an embodiment of a screen applied in practice of the present invention.

FIG. 5 and FIG. 6 show an embodiment of a transparent or translucent screen element 45 and a reflective screen element 41. In case of a transparent or translucent screen, an illumination apparatus 43 is placed behind the screen element to illuminate the screen element. In case of a reflective chart, an illumination apparatus 43 is placed outside of the light paths including a screen element 45, image forming optics 15 and image sensor 17 to illuminate the screen element 45.

Above mentioned transparent or translucent screen element 45 comprises, for instance, a entire base made of a translucent plastic or frosted glass having the aforementioned dark area painted in black paint. The aforementioned reflective screen element 41 comprises, for instance, a sheet of white paper or a piece of plastic plate having the aforementioned dark area painted in black and a light area left unpainted or covered with a solid material, such as magnesium oxide, or covered with a light emitting material such as an electro-luminescence panel (EL).

Referring to FIG. 7 through FIG. 13, the above-mentioned evaluation method of the optical apparatus will be discussed. In the following operational procedures, a sampling is done by a sampling circuit 19, a computation is done by an arithmetic operational circuit 21 and the results of the computation are displayed on a display apparatus 23 in the form of a graphic expression. The evaluation (of the subjected optical system for the examination) based on the computed results is done by a evaluation means 25 or by the operator of the apparatus.

Figure 7:
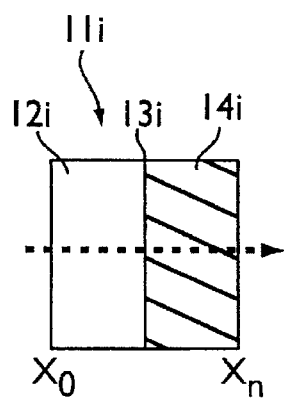
FIG. 7 is a schematic plan view to show an image of a screen and sampling direction in practice of the present invention.
Figure 8:
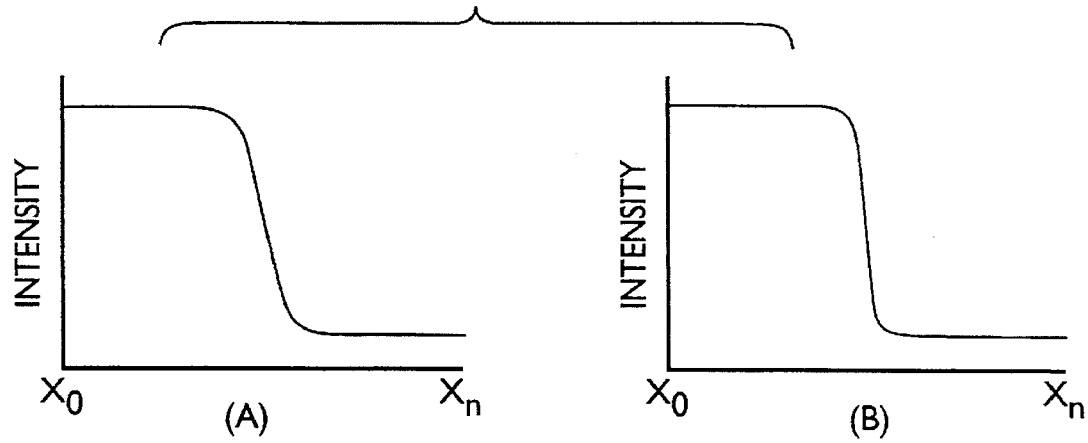
FIG. 8 are graphs showing the light intensity distribution of an chart image.
Figure 9:
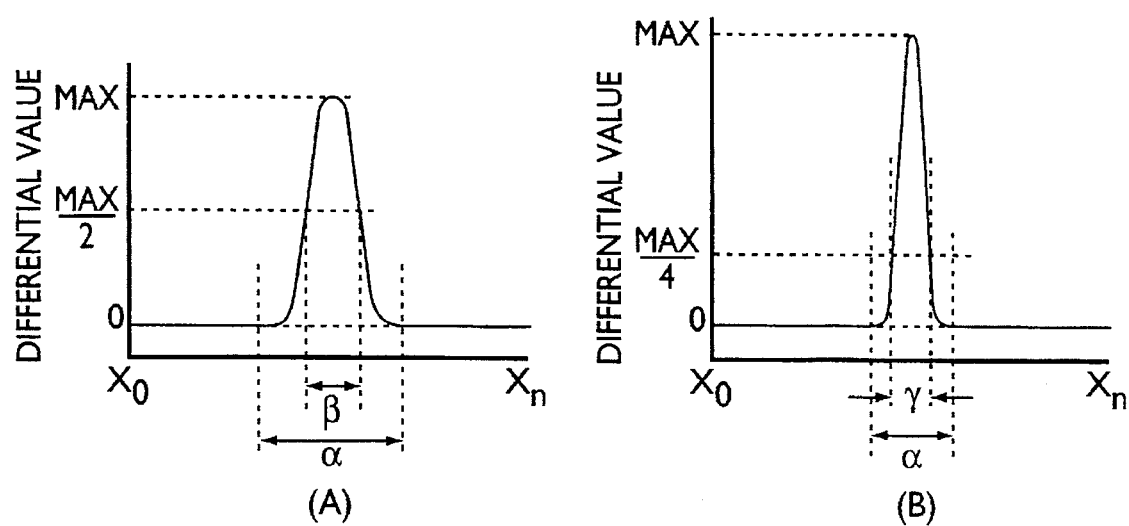
FIG. 9 are graphs showing a differential value of a light intensity distribution curve of FIG. 8.

In this embodiment, a screen image 11i formed on image sensor 17 is sampled in a direction perpendicular to the edge image 13i or position coordinates $X_o$ to $X_n$ setting a horizontal coordinate axis (abscissa) perpendicular to the optical axis, as shown in FIG. 7. FIG. 8 shows a graphic curve taken from the sampled light intensity distribution. The abscissa herein represents positions in a direction perpendicular to the edge image 13i and the ordinate represents the light intensity. As shown in the graph, the light intensity sharply changes at both sides of the edge image 13i. If the edge image 13i is sharp or in a state of sharp focus, the light intensity of the edge image changes extremely quickly or almost vertically on the graph. If the edge image 13i is not sharp or in a state of defocus, the light intensity of the image changes slowly corresponding to the amount or defocusing. From this phenomenon, it is easily understood that the image displayed by graph "B" in FIG. 8 is sharper than that of graph "A". In FIG. 9, graphs (A) and (B) show differential curves of the respective light intensity curves shown in FIG. 8(A) and (B). In this embodiment, the differential curve is utilized as a line spread function (LSF). In these graphs, alpha ($\alpha$) represents the width between two sampling points wherein the LSF reaches zero on both sides of the peak value of the LSF. Beta ($\beta$) represents the width between two half peak sampling points in which the LSF becomes ½ peak value, and gamma ($\delta$) represents the width between two quarter peak sampling points in which the LSF becomes ¼ peak value.

Figure 10:
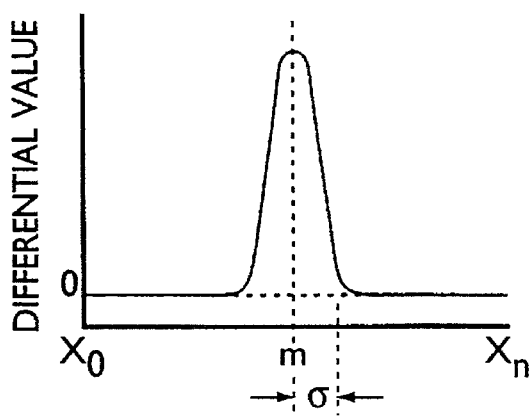
FIG. 10 is a graph to show a differential value of a light intensity distribution curve.

FIG. 10 shows the average value m and standard deviation sigma ($\sigma$) of the curve (A) of FIG. 9. The m and sigma are expressed by the following Formulae 1 and 2 wherein f(x) is the function of LSF.

Formula 1:

$$m = \frac{\int_{x_1}^{x_2} x f(x) dx}{\int_{x_1}^{x_2} f(x) dx}$$

Formula 2:

$$\sigma = \sqrt{\frac{\int_{x_1}^{x_2} (x-m)^2 f(x) dx}{\int_{x_1}^{x_2} f(x) dx}}$$

In the above formulae, $x_1$ and $x_2$ specify beginning and ending points of the subjected region of computation.

The evaluation values alpha, beta, m, and sigma are obtained by moving the image sensor 17 along the optical axis, or changing the distance between the first optics 31 and the entrance face of optical fiber bundle 33. The best image plane position is the longitudinal position of the image sensor 17, or the distance between the first optics 31 and the entrance face of the optical fiber bundle 33, which gives the minimum evaluation values after the arithmetic operation applying the evaluation values, alpha, beta, m and sigma.

The best image plane position can, alternatively, be defined as the point intersecting the two evaluation curves derived from a pair of points in the object space, one at a far point and the other at a close point, the two points being on opposite sides of, and equidistant to the best image plane position in the image space.

A method to evaluate (or determine) the best image plane position is discussed below.

The mentioned evaluation value becomes greater as the optical performance of the subjected optics for examination gets worse or increases defocus, and becomes smaller as the optical performance gets better or the quantity of defocus decreases.

Figure 11:
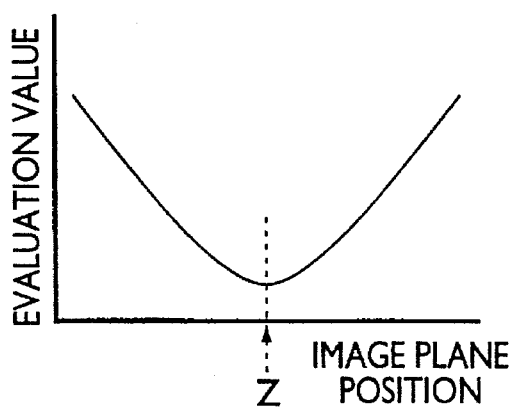
FIG. 11 is a graph to show the progression of the evaluation value related to a degree of optical movements, obtained from the graph of a differential value.

The best image plane position is determined by placing a screen 11 at a standard distance in the object space and moving the image sensor 17 along the optical axis until the evaluation value reaches the minimum point. FIG. 11 shows a graph wherein the point of the minimum evaluation value represented by z indicates the best image plane position.

Figure 12:
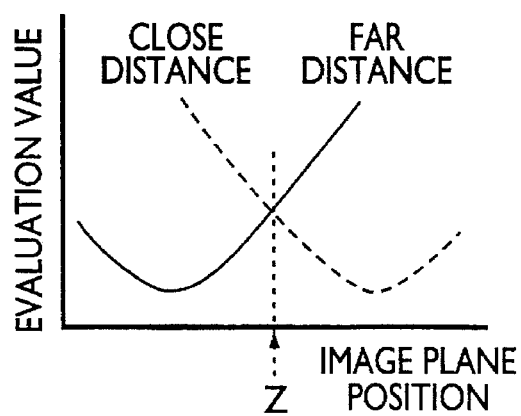
FIG. 12 is a graph to show the progression of the evaluation value related to a degree of optical movements of an embodiment shown in FIGS. 3 and 4.

In another embodiment of the present invention, shown in FIG. 3 and FIG. 4, the screen is placed at far and close distance points and evaluation values, similar to the one shown in FIG. 11, for each screen position are obtained by moving image sensor 17 along the optical axis. FIG. 12 shows the relationship of the evaluation values to the image sensor 17 position. The solid line curve represents a value for the screen at the far distance point while the dotted line curve represents a value for the screen at the close distance point. The best image plane position is defined as the point z where the evaluation values of each curve are equal.

In this embodiment, a width of a curve x and a standard deviation are applied as an evaluation value. By utilizing the above-mentioned width of a curve as the evaluation value, the computation time can be reduced while by utilizing the above-mentioned standard deviation as the evaluation value, stable evaluation values are obtainable.

FIG. 14 through FIG. 26 show the methods in accordance with the present invention to prevent or reduce moire interference fringes. The present invention provides methods to reduce moire interference by applying an image to a screen which does not have a repeated structural pattern, to reduce moire interference by increasing the number of samplings per line of optical fiber and to reduce moire interference by a smoothing operation.

Figure 14:
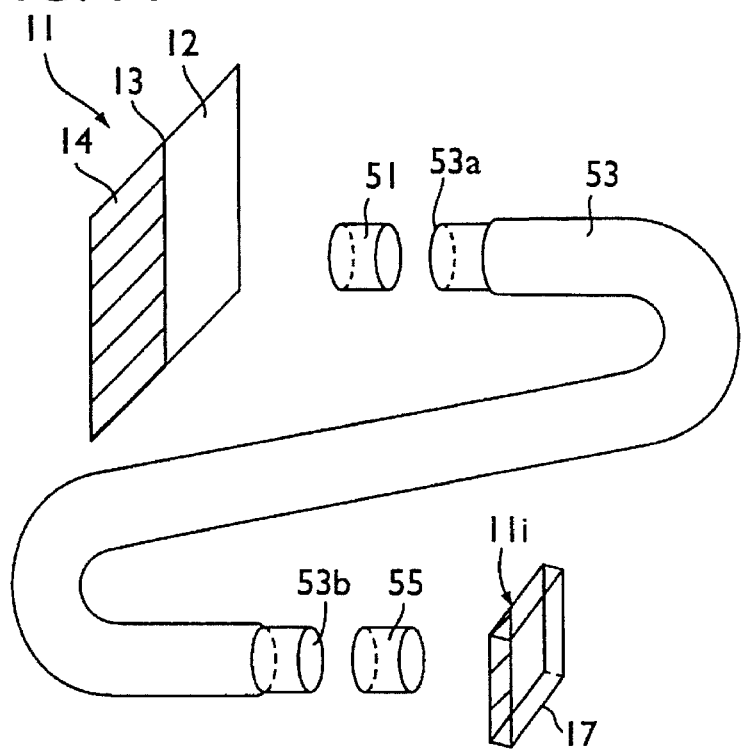
FIG. 14 is a schematic perspective view of an embodiment wherein the present invention is applied to evaluate an endoscope.

FIG. 14 shows an embodiment in accordance with the present invention wherein an objective lens of an endoscope is applied for the evaluation of the lens position. Normally, an objective lens 51 of an endoscope is fixed at a position in relation to an optical fiber bundle and is adjusted to observe an object located at a predetermined object distance area. Applying the method in accordance with the present invention, the lens position adjustment mentioned above can be done easily and simply. The embodiment shown in FIG. 14 is analogous to the embodiment shown in FIG. 2. In this embodiment, an inverted image of screen 11, formed on the entrance face 53a of an optical fiber bundle 53 by an objective lens 51, is transmitted through the exit face 53b of the optical fiber bundle 53 and projected on the light receiving face of an image sensor 17 as an erected image 11i by an eyepiece optical group 55. The optical fiber bundle 53 herein is a bundled plurality of optical fibers 52 in a tight hexagonal structural pattern.

Figure 15:
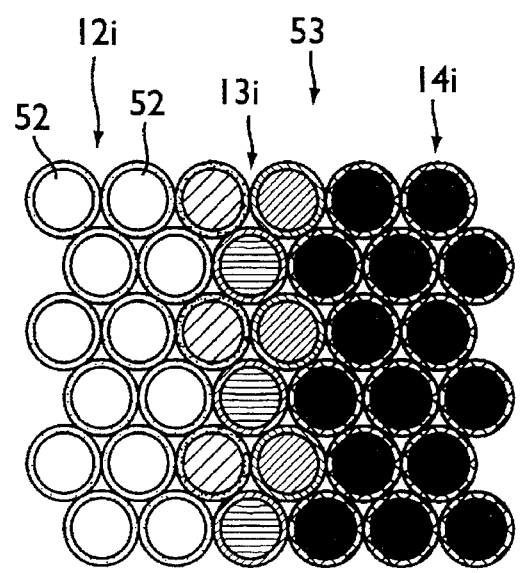
FIG. 15 is a schematic drawing to show the state of image forming in said embodiment shown in FIG. 14.
Figure 16:
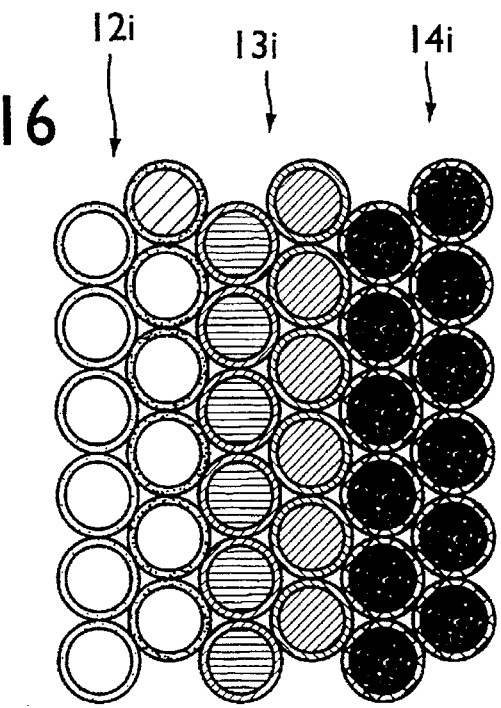
FIG. 16 is a schematic drawing to show the state of image forming in said embodiment shown in FIG. 14.
Figure 17:
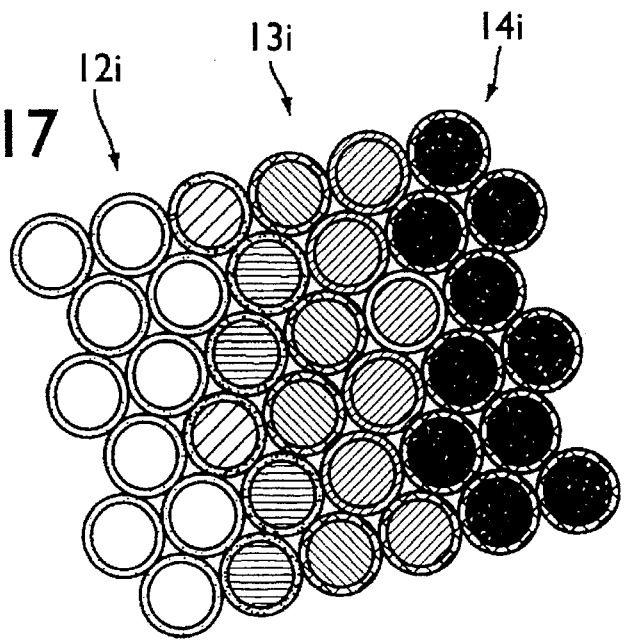
FIG. 17 is a schematic drawing to show the state of image forming in said embodiment shown in FIG. 14.

FIG. 15 to FIG. 17 show an image formed on the aforementioned entrance face 53a. The image includes a light image 12i, a dark image 14i and an edge image 13i comprising a border line between the light image 12*i* and the dark image 14*i*. The proportion of the light image 12*i* to the dark image 14*i* shared by each optical fiber 52 is not equal, and therefore, the light and dark image distribution of the edge image 13*i* is not the same between them. In other words, when traced, the optical fibers having the same light intensity do not make a straight line (refer to FIG. 15 and FIG. 17). If the light intensity distribution of the image is sampled sideways or one dimensionally (along a straight line) at the exit face of the optical fiber bundle, the light intensity distribution reading varies depending on the vertical position of the sampling, thus, an accurate light intensity distribution cannot be sampled. When the line of optical fibers 52 coincide with the line of the edge image 13*i* as shown in FIG. 16, a one dimensional sampling of the light intensity distribution reading still varies depending on the vertical position of the sampling.

The present invention provides a method to solve the above-described problems because the sampling is done two dimensionally and an averaging out of the sampled values is performed.

Figure 18:
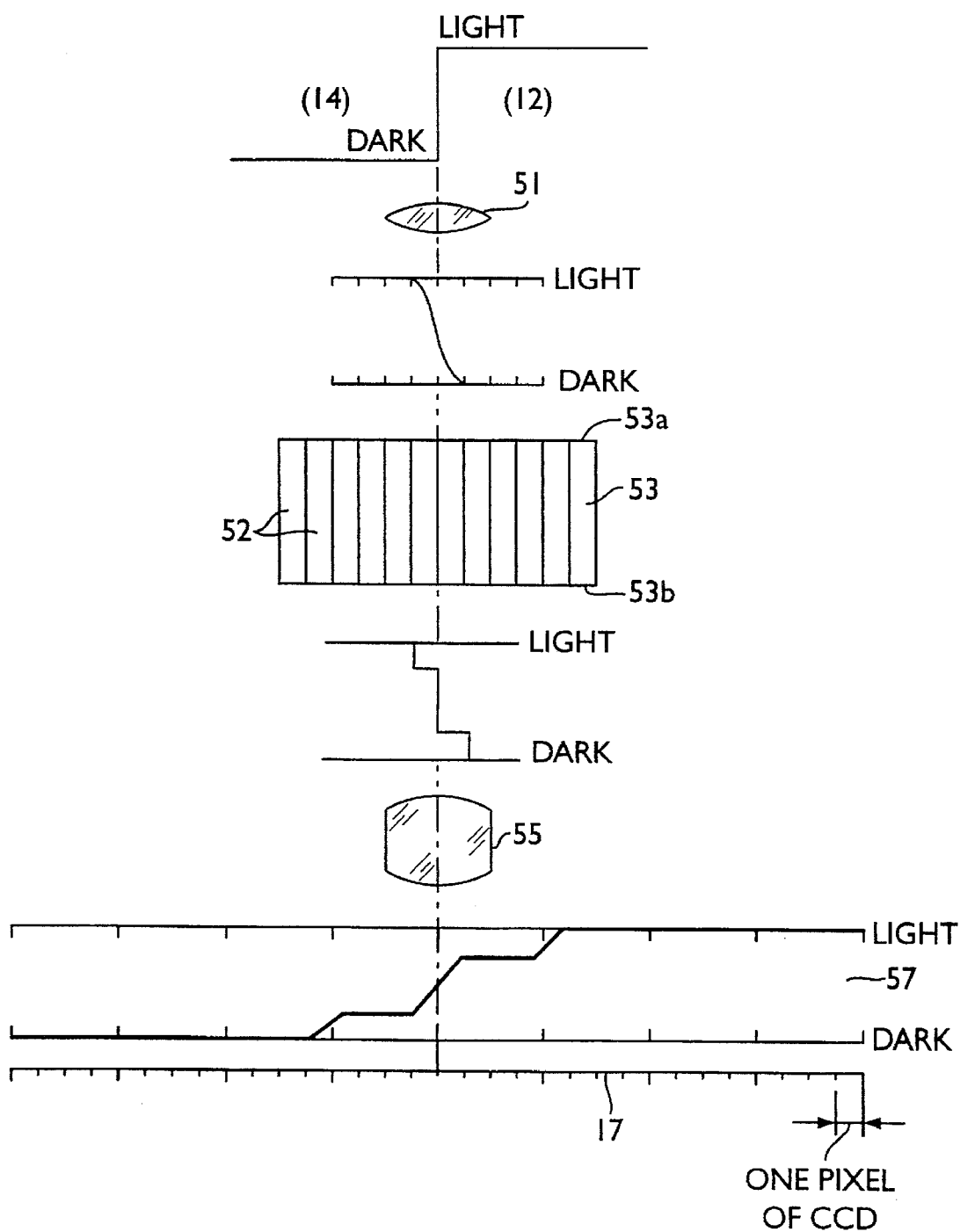
FIG. 18 is a schematic diagram to show the transmission of the image in said embodiment shown in FIG. 14.
Figure 19:
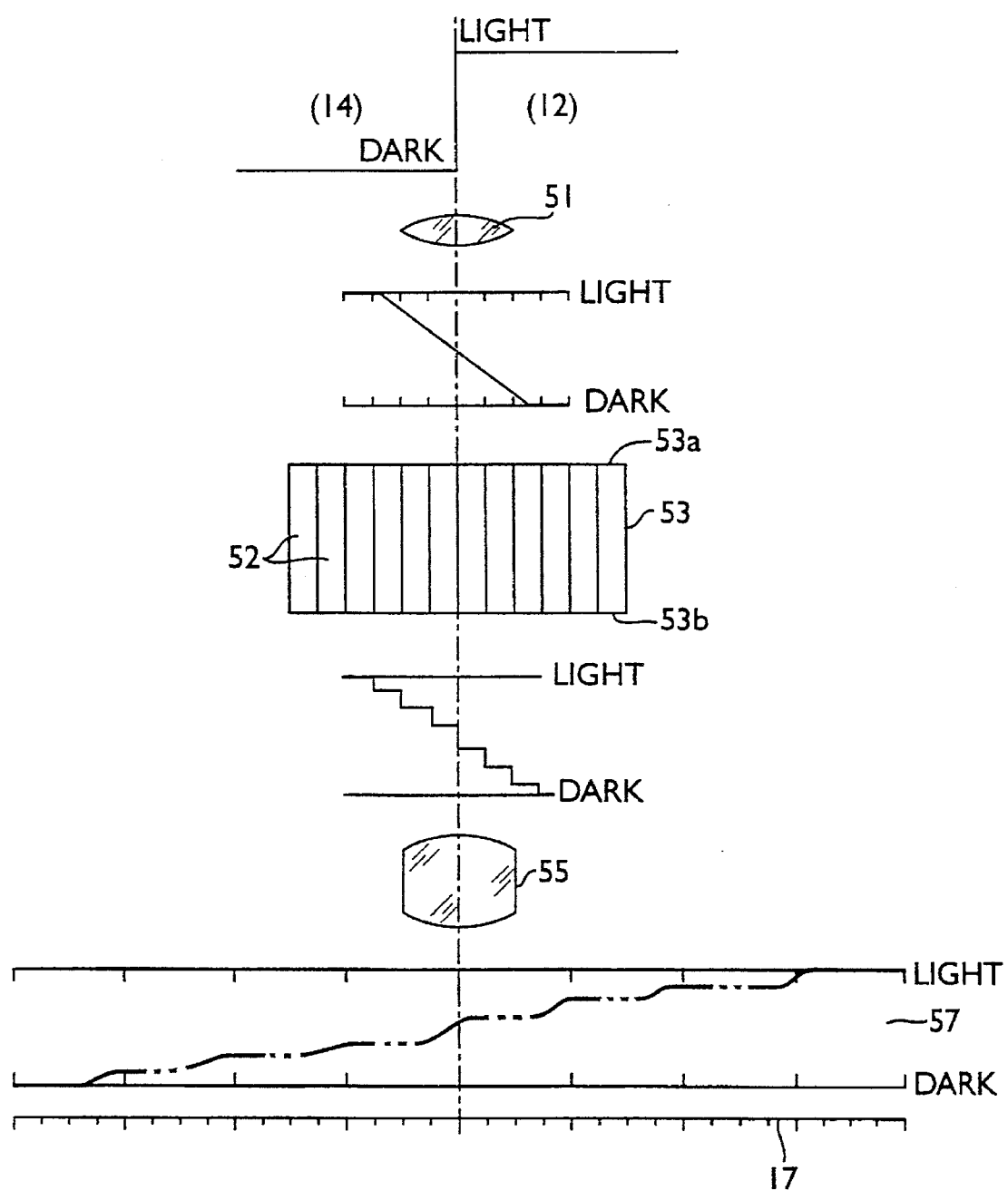
FIG. 19 is a schematic diagram to show the transmission of the image in said embodiment shown in FIG. 14.

FIG. 18 and FIG. 19 show transmission of an image of a screen 11. The image of the screen 14, 12 is formed on the entrance face 53*a* of an optical fiber bundle 53 as an inverted image by an objective lens 51 and transmitted from the exit face 53*b* of the optical fiber bundle 53 to project on the face of a light receiving means 17 as an erected image by an eyepiece lens group 55. The degrees of spreading out of the images formed by the objective lens 51 and the eyepiece lens group 55 can be calculated from the optical design data. Normally, the image spreading of an object lens is designed to be approximately one line's worth of optical fiber quantity. Since the diameter of each optical fiber is known, the degree of image spreading on the face of the an image sensor 17 can be provisionally calculated.

FIG. 18 and FIG. 19 also show an intensity distribution 57 of the image of screen 11, focused on the image sensor 17 and sampled sideways in a line of elements in a light receiving device or image sensor 17. The image formed on the entrance face 53*a* is transmitted on one line of the optical fiber bases while the width of an element of the light receiving device is narrower than the diameter of an optical fiber. The ratio of the fiber diameter to the width of a light receiving element in this embodiment is 4:1. The light intensity distribution changes, therefore, on the one line of optical fiber bases in a step-wise manner. FIG. 18 herein represents a focused image and FIG. 19 represents a defocused image.

The above-mentioned optical fiber bundle 53 has a tight hexagonal structural pattern comprising at least twenty optical fibers 52, wherein each fiber further comprises a core 52*a* and a cladding 52*b*. Such a structural pattern causes a variation in the transmitting pattern when rotated about the axis of the optical fiber bundle. In this situation, moire interference fringes can be observed if a pixel of the image sensor 17 corresponds to a line of optical fiber. In this embodiment, however, each optical fiber 52 is matched by four pixels along its diameter and an image transmitted by a line of fibers is sampled by more than four pixels. Thus, the moire interference fringes are prevented from occurring.

Figure 20:
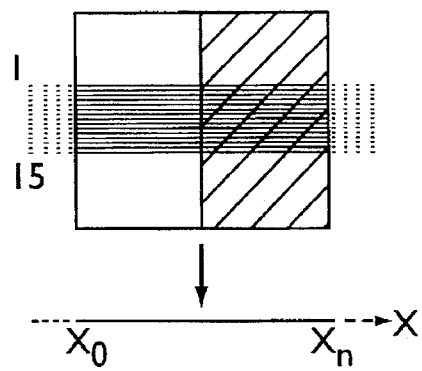
FIG. 20 is a schematic diagram to show the averaging process of an edge image applied along said edge in said embodiment shown in FIG. 14.

FIG. 20 shows the process of obtaining one dimensional data by averaging out the sampled data taken along the edge image 13*i*. The number of lines which are subjected to be averaged in case of FIG. 15 and FIG. 16 are approximately (2 optical fibers)×(pixel density), in case of FIG. 17 are approximately (4 to 5 optical fibers)×(pixel density) are utilized.

Figure 21:
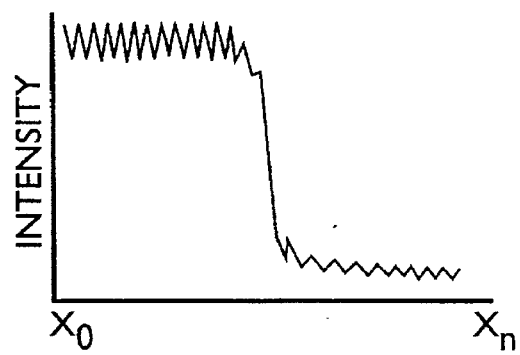
FIG. 21 is a graph to show the light intensity distribution curve of the edge image in said embodiment shown in FIG. 14.
Figure 22:
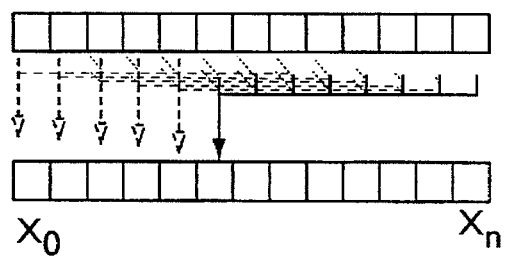
FIG. 22 is a schematic diagram to show the smoothing process in said embodiment shown in FIG. 14.

FIG. 21 shows light intensity expressed by the one dimensional sideways data obtained by the process described above. The obtained data at this stage, as clearly shown in the above-mentioned illustrations, still includes horizontal periodic noise. To remove such noise, a smoothing process is applied as shown in FIG. 22. The smoothing process shown in this embodiment is to average eight (8) pixels worth of data from the upper left end to make a new one pixel data. The pixel numbers to be averaged depends on the image size of the periodic structural pattern of the optical fiber bundle and the size of the pixels to be sampled. In this embodiment, the number of pixels are eight to ten pixels.

Figure 23:
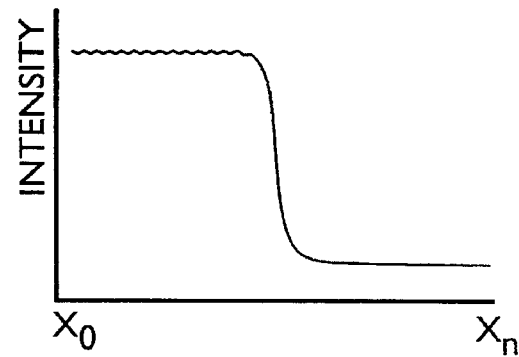
FIG. 23 is a graph to show the light intensity distribution curve of the edge image after said smoothing process.

After the averaging process, the noise included in the horizontal one dimensional data is reduced, as shown in FIG. 23.

The evaluation values can be obtained at this stage. Although it is not shown, the distance between the inflection points where the curve rises, or falls, as shown in FIG. 23, can be calculated.

Figure 24:
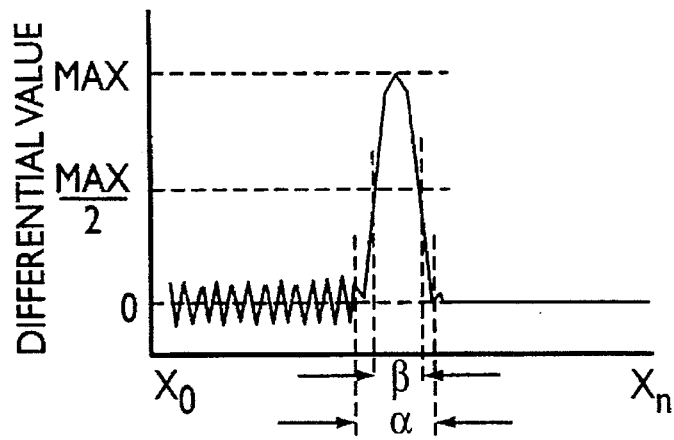
FIG. 24 is a graph to show the differential value of the light intensity distribution curve of the edge image.

In a further process, by deriving a differential coefficient from the data shown in FIG. 23, a line spread function (LSF) can be obtained, as shown in FIG. 24. Oscillations caused by the repetitive pattern that cannot be removed by the smoothing process remain on the left side of the curve. The width of the central projected curve corresponds to the degree of image spreading. The right half of the curve, the low light intensity portion, does not include the periodic oscillation components removed by the smoothing process. By taking a Fourier transform of the above-mentioned data, an MTF can be obtained a shown in Fig. 26 and the image transmission efficiency of the optical system in sharp focus can be evaluated.

Figure 25:
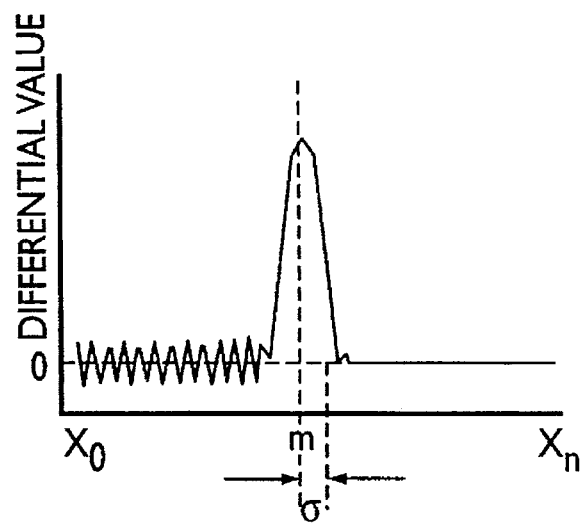
FIG. 25 is a graph to show the differential value of the light intensity distribution curve of the edge image.
Figure 26:
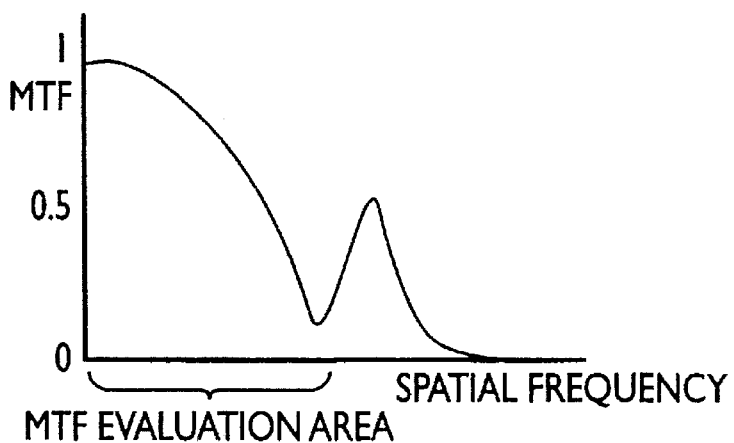
FIG. 26 is a graph to show MTF obtained by Fourier conversion of the differential value of FIGS. 24 and 25.

Also, at this stage, the aforementioned alpha, the width of the peak value of the curve, and beta, the width of half peak of the curve, shown in FIG. 24, and sigma, the standard deviation calculated from the distribution curve, shown in FIG. 25, can be calculated. The present invention provides a short operational time for the Fourier transform process which is common but conventionally takes much time.

The above discussed embodiment shows the case wherein the image sensor is an area sensor but a line sensor or point sensor can replace the area sensor by scanning the image space to obtain the same image. Also, a smoothing process with computing means can be replaced with an optical low pass filter inserted in front of the aforementioned light receiving means. The low pass filter smooths the optical image removing the necessity for the computation process. Although the optical configuration becomes more complicated, the computation process is reduced in return.

The embodiment, described above applies to an edge screen having a light and a dark area. The edge screen can be replaced with a line screen. But utilizing a line screen, the input image makes an LSF as it is and can reduce the above-described computation process and required time.

Figure 27:
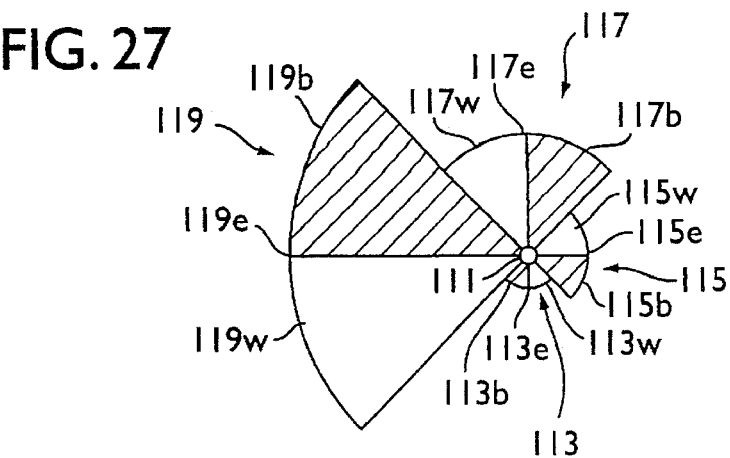
FIG. 27 is a front view of the radial chart board included in the chart apparatus of the present invention.
Figure 29:
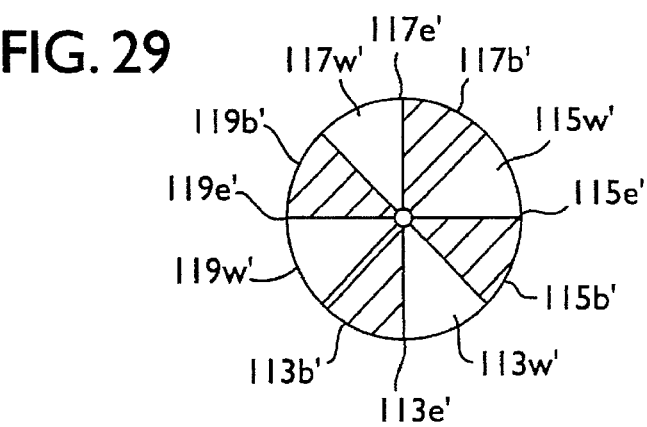
FIG. 29 is a front view of the image of radial chart apparatus.

The present invention in relation to a screen apparatus will be discussed in an embodiment with the illustrations below. FIG. 27 and FIG. 29 illustrate an embodiment of a screen apparatus in accordance with the present invention. The screen apparatus 110 is used for the optical focus adjustment or examination of an endoscope or a fixed focus camera having a limited range of object or subject distance for observing or photographing.

The screen apparatus 110 includes four sectors of screen masks 113, 115, 117 and 119 fixed on a rotating shaft 111 at differential radial angles and having different radii from each other, with approximately 90 degrees of arc. The surface of each screen mask 113 to 119 is painted in black and white dividing each sector in approximately two equal parts along its radius. In other words, sectors form black and white or dark and light screens having light areas (painted in white or light color) 113w, 115w, 117w and 119w, and dark areas (painted in black or dark color) 113b, 115b, 117b and 119b. The light areas 113w, 115w, 117w, and 119w and the dark areas 113b, 115b, 117b, and 119b divide each screen 113, 115, 117 and 119 into substantially equiangular sectors respectively, forming radial edges 113c, 115c, 117c, and 119c, which form radial one dimensional edge images.

The above-mentioned rotating shaft 111 is rotatably held by two columns 123 and 123' fixed on a base 121 at a distance longitudinally. The rotating shaft and screens 113 to 119 are driven and controlled by a driving apparatus 125, which rotates and stops the shaft 111 and screens 113 to 119 to any required position. The driving apparatus 125 can be a motor driven system or manual system driven by an operator.

The screens 113 to 119 are spirally fixed on the shaft 111 so that they do not overlap each other when observed from the subjected optical system for examination. In other words, each edge 113e, 115e, 117e and 119e of each screen is positioned at a relative angle of 90 degrees to each other. The distance between the screen masks 113 and 119 and the subjected optical system is determined to correspond to the distance between the shortest distance (close point) and the longest distance (far point) of the regular observation. The second and third screens 115 and 117 are positioned such that both second and third screen masks, 115 and 117 respectively, are in equal degree of defocus from the subjected optical system for examination when the first and fourth screen, 113 and 119 respectively, are in equal degree of defocus. The radii of the screen 113 to 119 are made proportional to the above-described object distances respectively considering the weights, costs and other factors. For instance, the relationships of radii and distances satisfy following formula;

$$R1/D1 = R2/D2 = R3/D3 = R4/D4$$

wherein, radii of screens 113 to 119 are R1, R2, R3 and R4, respectively, and the object distances of the screen to the subjected optical system are D1, D2, D3 and D4, respectively.

Alternatively, all the radii can be the same regardless of the object distances.

Figure 28:
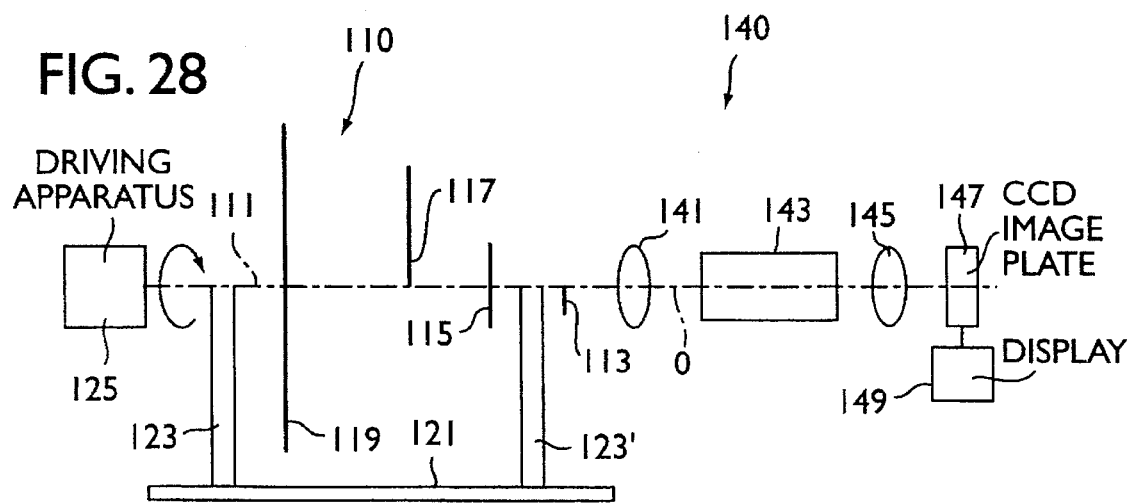
FIG. 28 is a schematic side view to show the application of the chart apparatus including chart boards.

FIG. 28 illustrates an embodiment of the screen apparatus 110 applied to the focus adjustment of an endoscope 140. In this embodiment, the positions of the first screen 113 and the fourth screen board 119 are matched to the shortest object distance (close point) and the longest object distance (far point), respectively, of observation by the endoscope 140.

The screen apparatus 110 is arranged to match the center of its rotating axis 111 to the optical axis O of the objective lens 141 of an endoscope 140 and at the same time, the position of its first screen 113 coincides with the close point of the optics. The light rays reflected by the screen 113 to 119 are focused on the entrance face of an optical fiber bundle 143 by the objective lens 141 then transmitted from the exit face of the optical fiber bundle 143 and focused on a CCD image plate 147 through an eyepiece optical system 145 and finally observed as a visible image on a display 149, as shown in FIG. 28. In observation, the image 113b', 115b', 117b' or 119b' of each dark area 113b, 115b, 117b or 119b and the image 113w', 115w', 117w' or 119w' of each light area 113w, 115w, 117w or 119w are approximately the same size and the same shape to each other, as shown in FIG. 29. The light receiving plane of the CCD image plate and its position corresponds to the observation plane and its designated position of the endoscope 140.

By observing the images obtained through the above-described methods on a display 149, the focusing adjustment can be done simultaneously by observing the image qualities at each of the object distances. Applying the screen apparatus 110 in accordance with the present invention, the screen 113 to 119 can be rotated on its rotation axis 110, changing the screen positions, and other maneuvering can be done easily.

Since the optical fiber bundle 143 is an asymmetric optical system in this case a tightly packed hexagon patterned bundle of optical fibers, the image transmitted through the optical fiber bundle changes in quality due to the twist of the bundle around the optical axis. To compensate for such a change, the screen 113 to 119 can be positioned to the relatively same position by rotating the screens 113 to 119 by activating the driving apparatus 125. In this way the degree of defocus can be observed under approximately the same conditions at all object distances.

The above discussed embodiment applies four screens 113 to 119, though the number of screens applied for an evaluation is not limited to that number. If one or more pairs of screens are used for the examination of defocusing, two or six screens can also be used. If one of the screens is placed at the focused point, three or five, and more than five, but an odd number of screens, can be utilized. When the screen apparatus includes three screens, the angle of arc of each screen board is designed to be 120 degrees or 360°/3. In general, the angle of arc of each screen board is determined at 360°/n wherein n represents the number of screens used. The n is an integer value of 2 or greater. The screens should be placed about the rotating axis at relative nonoverlapping angles to each other. The screens can be arranged, when viewed from subjected optical system for examination, to form a complete circle with their arcs or can be arranged not to make a circle.

Also each screen 113 to 119 can be arranged to move along the rotating axis or fixed on the shaft.

The above-mentioned embodiment of the screen apparatus was applied to an endoscope 140, but the present invention is not limited to such an application and can be applied to other optical systems. The screen image can be observed by an operator through an eyepiece 145 while the embodiment displays the screen image on a display 149 through the photo-electro conversion process by a CCD image plate 147. The screen image can be photographed on a piece of photographic film for record.

Figure 30:
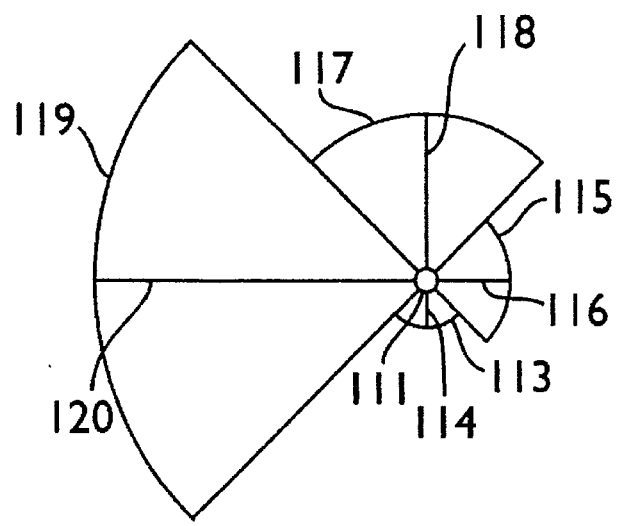
FIG. 30 is a front view of a chart board in the second embodiment.
Figure 31:
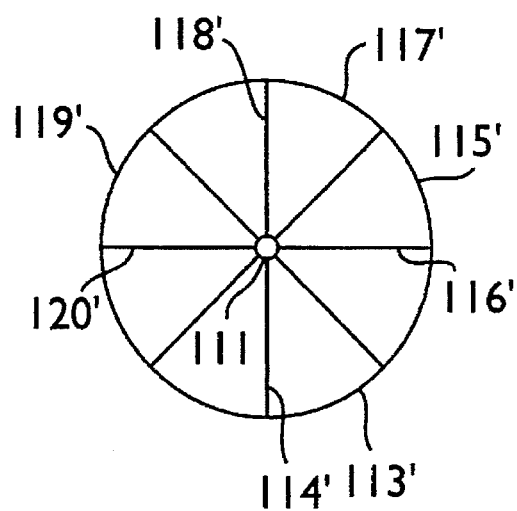
FIG. 31 is a front view of the image of the second embodiment.

FIGS. 30 and 31 show another embodiment wherein the light and dark edge of the screens 113 to 119 are replaced with line screens. In this embodiment, the edges 113e to 119e, previously discussed, formed by a border line between light areas and dark areas are replaced with black lines 114, 116, 118 and 120. FIG. 30 corresponds to FIG. 27 and FIG. 31 corresponds to FIG. 29, respectively. Accordingly, black lines 114', 116', 118' and 120' correspond to the border lines 113e', 115e', 117e' and 119e', respectively, in FIG. 29. The remaining features of the screen apparatus, are the same as the previous embodiment. Lines 114, 116, 118 and 120 are formed as radial lines with equal line width, and the images 113', 115', 117' and 119' are formed to have approximately the same area and shape as one another, and each is equally divided by the respective one of line images 114', 116', 118' and 120'.

Figure 32:
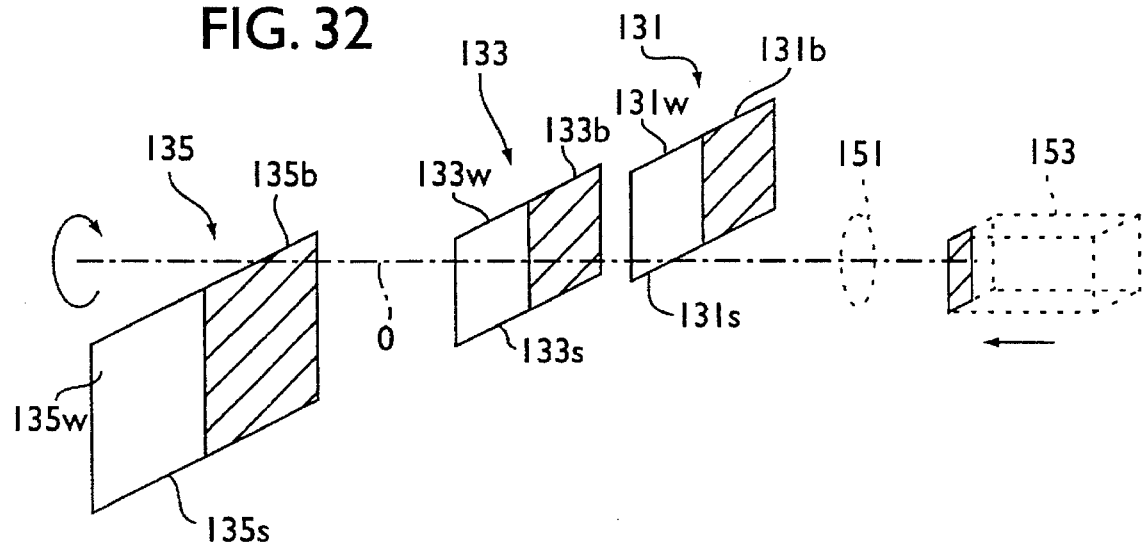
FIG. 32 is a schematic perspective view of the chart boards of the third embodiment of the present invention.
Figure 33:
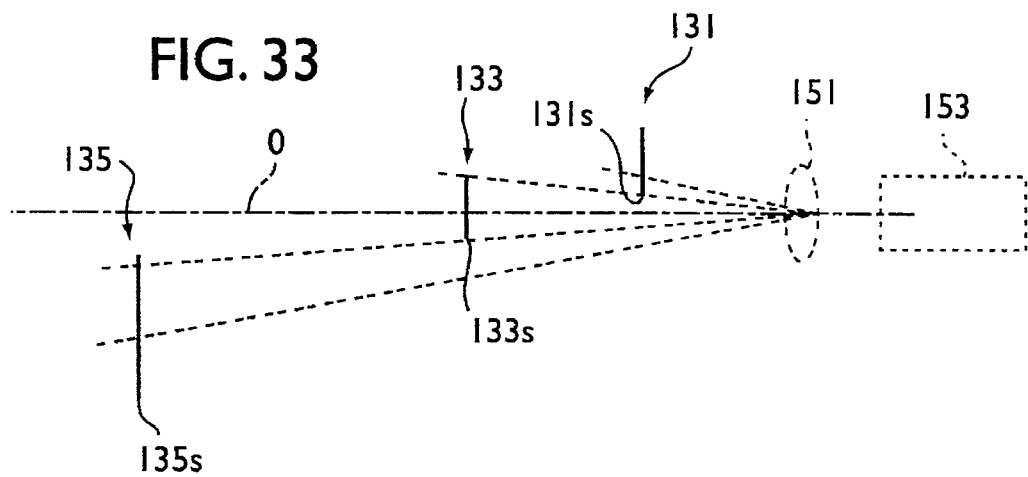
FIG. 33 is a schematic side view of the third embodiment.
Figure 34:
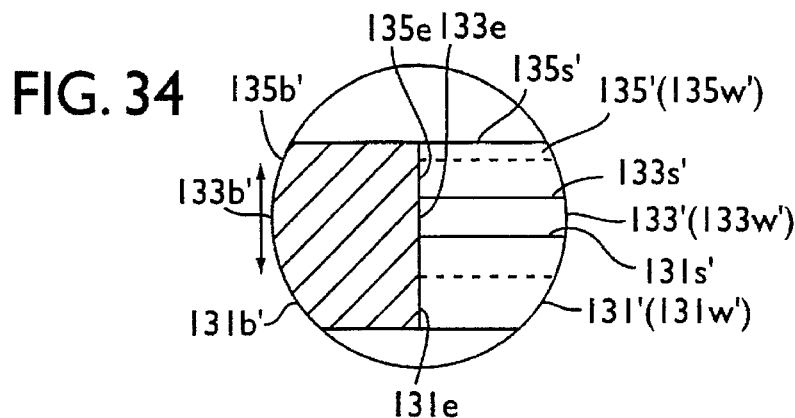
FIG. 34 is a schematic side view to show the image of the chart apparatus of the third embodiment.

FIGS. 32 to 34 show yet another embodiment of the present invention. The first, second and third screens 131, 133 and 135, respectively, are formed in the shape of rectangles. Each screen board 131, 133 and 135 has a light area 131w, 133w or 135w and a dark area 131b, 133b or 135b, respectively, on respective, opposite sides of each vertical center line forming edges 131e, 133e and 135e, respectively. The screens 131, 133 and 135 are positioned longitudinally along an optical axis O having specific distances to each other. The first and third screens are placed above and below the optical axis O, respectively, wherein edges 131e and 135e make a straight vertical line. In other words, the screens are positioned to make steps making a straight edge line vertically as shown in FIGS. 32 and 33. The images of the screens 131' to 135' are formed by a subjected optical system under examination on a light receiving face or focal plane of a light receiving device 153 line up from the bottom to the top on the focal plane. FIGS. 33 and 34 show the spatial relationships of bottom edges 131s to 135s of screen 131 to 135 and the images of the bottom edges 131s' and 135s', respectively, formed on the focal plane. The vertical distances of the screens 131 to 135 from each other are set as indicated by dotted lines in FIG. 33. The edge images 131e' to 135e' herein form a straight line coinciding with the optical axis.

In the above discussed embodiment, the screens 131, 133 and 135 cannot be observed or examined under a same condition simultaneously in relation to the optical axis, though in practice, all the screens are placed within the paraxial region, or in the close neighborhood of the optical axis presenting no practical problem. By the same argument, the edge images 131e', 133e' and 135e' are not necessarily placed in line provided that they are placed in a close neighborhood of the optical axis. In this embodiment, the screens 131, 133 and 135 are arranged to project their images simultaneously within 30 percent of the image forming region, or the region for observation around the optical axis, or within the area shown by the dotted lines in FIG. 34. As the screens move along the optical axis, the screen images 131', 133' and 135' move correspondingly, thereby enabling the operator to conduct specific examinations at specific object distances. Being rotated about the optical axis, the screens 131 to 135 can easily provide the same examination conditions even though a subjected optical system to examination comprises an asymmetrical optical pattern.

The screen arrangement shown in this embodiment can be applied to reflective, transparent, translucent or light emitting types of screens and the light and dark areas can be reversed, as well. In this embodiment the rotating shaft and the optical axis coincide with each other but in practice they are not required to coincide with each other.

Figure 35:
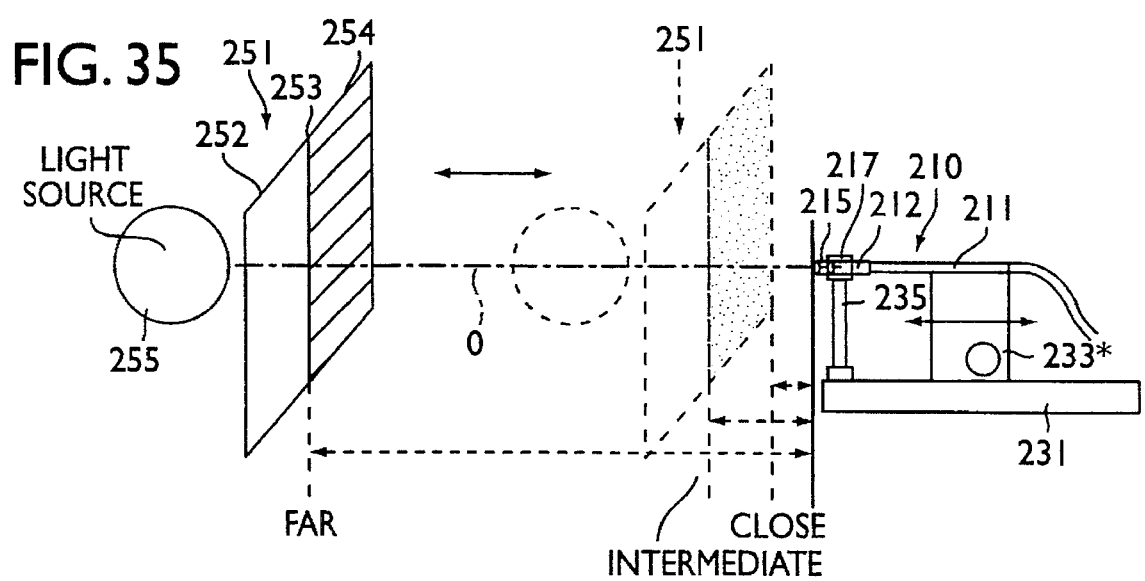
FIG. 35 is a diagram to show outline of a focus evaluation adjustment apparatus of an endoscope wherein the focus evaluation method employs an adjustment method of another embodiment.
Figure 36:
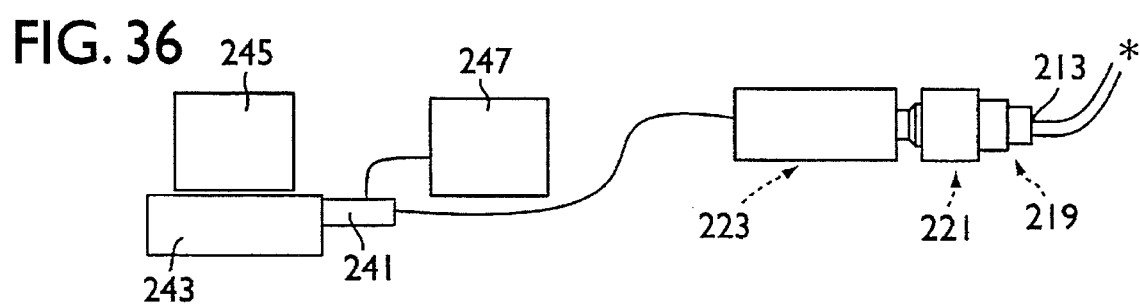
FIG. 36 is a schematic diagram of a circuit arrangement of said embodiment.

An image sharpness evaluation technique and focus adjustment method relating to another embodiment of this invention will be explained below with the accompanying drawings. FIGS. 35 to 39 are the diagrams of major parts of the overall arrangement of a focus adjustment apparatus to examine an objective optical system of an endoscope applying the present invention. FIGS. 35 and 36 illustrate an embodiment wherein a screen apparatus provided by the present invention, moves along the optical axis. A screen 251 forms an edge image by its border line between a light area and a dark area. The image of the screen 251 is evaluated by the degree of defocusing.

The optical fiber scope or the endoscope, subjected to the focus adjustment, comprises an optical fiber bundle 210 further having numbers of optical fibers tightly arranged in a hexagonal pattern, and an objective lens 215 mounted on its objective end 212. The objective lens 215 is fixed inside an objective lens mounting tube 217 and is mounted on the objective end 212 of the optical fiber bundle 211 through the mounting tube 217.

The optical fiber bundle 210 is fixed to a movable stage 233 at 211, and the objective lens mounting tube 217 (the objective lens 215) is further fixed on a fixture 235. The movable stage 233 and the fixture 235 are further fixed to a common bench 231. The movable stage 233 is longitudinally and linearly movable in relation to the fixture 235. The objective lens 215 is so held on the fixture 235 that the optical axis O of the objective lens is in parallel with the moving direction of the movable stage 233. The objective end 212 of the optical fiber bundle 211 is held by the movable stage 233 at a relative position wherein the entrance face of the objective end 212 is placed perpendicular to the optical axis O and the center of the entrance face is approximately aligned with the optical axis O. Incidentally, the optical fiber bundle 211 and the objective lens mounting tube 217 are fixed to the movable stage 233 and 235 respectively by clamp means, not shown. The movable stage 233 is arranged to move by being operated by a manual knob, not shown, or by a electrical driving system which is further controlled by a computer 243 described later.

A transparent or translucent screen 251 illuminated by a light source 255 from behind is placed in the object space of the objective lens 215. The screen 251 is divided into two equal sections by a light area 252 which transmits the illuminating light and a dark area 254 which does not transmit the light and is mounted with its edge 253 (the border line between the light area 252 and the dark area 254) vertical and perpendicular to the optical axis O. The screen 251 herein moves along the optical axis held by a screen moving mechanism arrangement, not shown. The screen 251 is moved to an expected closest objective distance (close point) of the optical fiber scope device, to an expected longest objective distance (far point), and to an expected focusing objective distance (intermediate point) located in between the close point and the far point. In the case of this embodiment, the close point is approximately 5 mm, the intermediate point is approximately 11 mm and the far point is approximately 111 mm.

An eyepiece lens 219 is mounted on the observation end (exit face or exit end) 213 of the optical fiber bundle 211 and on the eyepiece 219 further mounted is a CCD camera 223 through a camera adapter 221. An image of the screen 251 is formed on the objective end (entrance face) of the optical fiber bundle 211 by the objective lens 215 and transmitted through the optical fiber bundle 211 to the observation end (exit face) of the optical fiber bundle. The transmitted image is formed on a focal plane of a CCD camera 223, by the eyepiece lens 219, to be converted into electric image signals and outputted to an image input/output apparatus 241. In a normal application of the optical fiber scope 210, the image of the screen 251 is formed on the objective end (entrance face) of said optical fiber bundle 211 by the objective lens 215 and travels along the optical fiber bundle 211 already there to the observation end (exit face) of the optical fiber bundle 211. The transmitted image from the observation end is directly observed through the eyepiece lens 219, or displayed on a monitor TV through a CCD camera.

The above-mentioned image input/output apparatus 241 converts the image signals into video signals to display them on a TV monitor 247 and, at the same time, converts the input image signals into digital image data of a particular standard and transmits the converted signals to an image processing apparatus such as a personal computer, a work station, or other type of computer 243. An evaluation value detecting means, e.g., defocus quantity detecting means, and objective evaluation value setting means, e.g., objective defocus quantity setting means, comprise an image input/output apparatus 241 and a computer 243.

Figure 37:
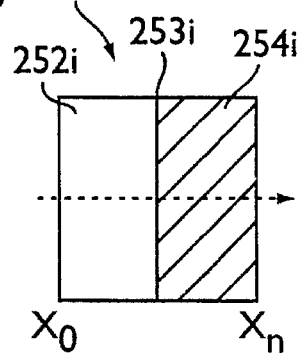
FIG. 37 is a front view of the chart image to show the sampling of said embodiment.
Figure 38:
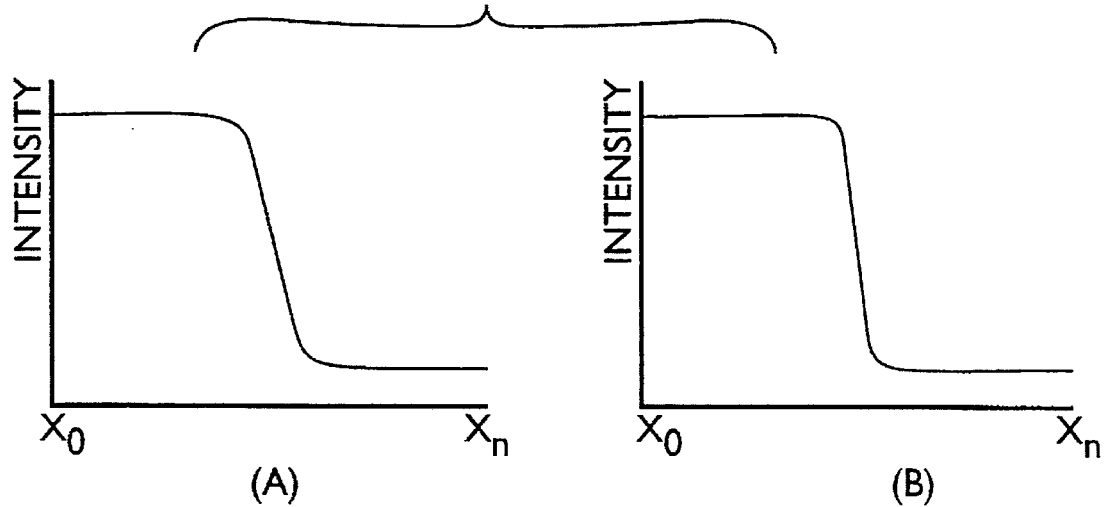
FIG. 38 are graphs showing the light intensity distribution of the chart image in sampling direction.
Figure 39:
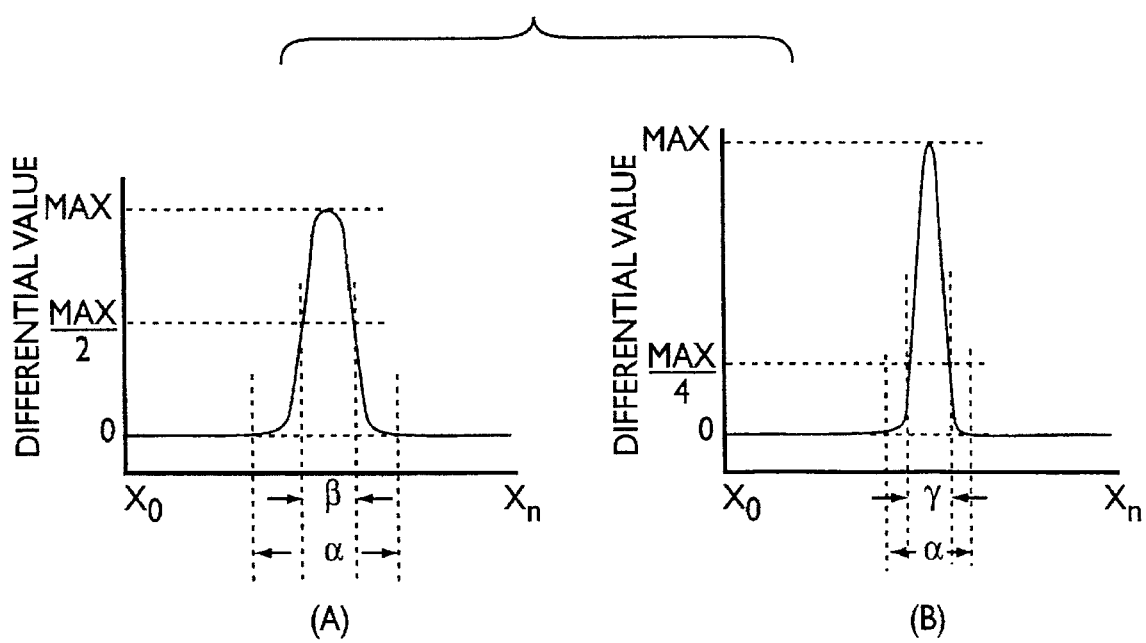
FIG. 39 are graphs showing the differential value of the light intensity curve.

Computer 243 samples a plurality of lines of horizontal image data in the neighborhood of the optical axis, and a portion of the input image data, in the vertical direction. The computer then derives a horizontal light intensity distribution curve after averaging the sampled data. FIG. 37 shows the relationship of the sampling position of the screen image and the sampling direction. FIG. 38 shows the light intensity distribution.

In the FIG. 38, curve (A) represents an out of focus state (large image spreading or defocusing) and curve (B) represents a sharp focus state (small image spreading or defocusing). When in focus, the outlines of the light image 252$i$ and dark image 254$i$ are formed clearly. Consequently, an edge image 253$i$ which is the broader between the two images is also formed very clearly and therefore, the light intensity of the images change sharply at the edge image 253$i$ in the perpendicular direction in relation to the edge image. In a case of out of focus, the spreading of the edge image 253$i$ becomes large as the absolute degree of defocus gets greater and therefore, the light intensity variation at the edge image changes more slowly.

The above-mentioned computer 243 further calculates the derivative of the light intensity distribution curves of FIG. 38. The derivatives of each are shown as FIG. 39(A) and (B). These differentiation curves express the quantity of defocusing by peak values (max.) and base widths. The higher the peak reaches, the smaller the defocus is and the narrower the base width becomes, the smaller the defocus becomes. For instance, in this embodiment, FIG. 39(A) shows an out of focus state while (B) shows a sharp focus.

The computer 243 further calculates an average m and a standard deviation, sigma, by the formula 1 and formula 2 respectively from the aforementioned differential values expressed as functions f(x).

Figure 40:
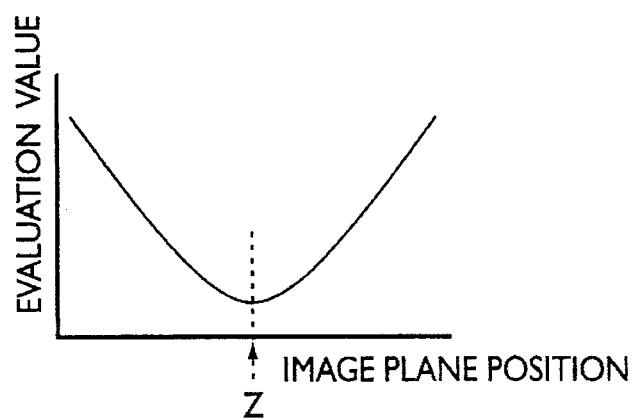
FIG. 40 is a graph to show the relationship between the lens-to-focal plane distance and focus evaluation value.

The above-mentioned alpha, beta, gamma and/or sigma are utilized as evaluation values. FIG. 40 is a graph to show a relationship between the distance from the objective lens 215 to the objective end of the optical fiber bundle 211 (hereinafter the lens-to-bundle distance Z) and an evaluation value. The graph shows that the peak position of the evaluation value is the focus point.

Changing the lens-to-bundle distance Z by moving the movable stage 233, intermittently or continuously, the computer 243 obtains evaluation values, intermittently or continuously, through the above-described computation process and display the results on a display 245. This series of operations is repeated on each of the close point, intermediate point, and far point of the screens 251.

Figure 41:
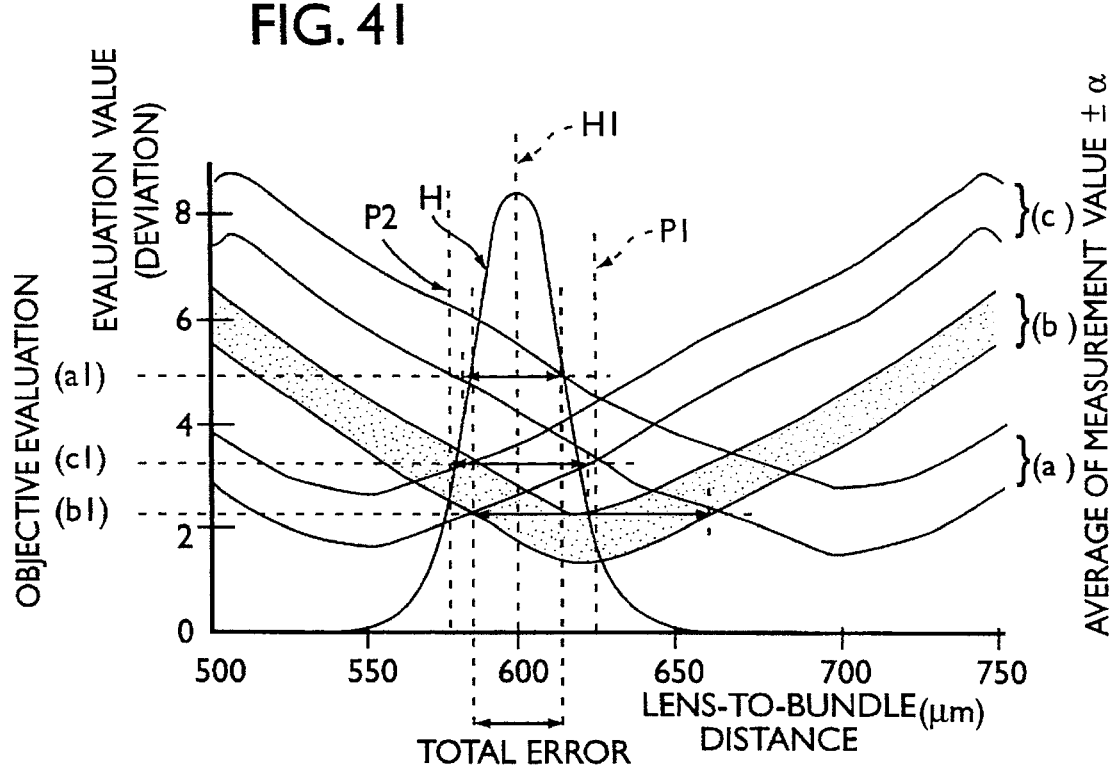
FIG. 41 is a graph to explain the relationship between the objective value and the evaluation value of the image of the chart located in the object space.

FIG. 41 shows the relationships between the lens-to-bundle distance Z and the resultant evaluation values. In this example, the standard deviation sigma is used as the evaluation value. The graph shows that the smaller the evaluation value is, the smaller the defocus quantity gets and image quality becomes better. In the drawing, the range (a) is the averaged evaluation values of the close point, range (b) is the averaged evaluation values of the intermediate point and range (c) is the averaged evaluation values of the far point.

According to the conventional focus adjustment method, the focus of the optical system under study is adjusted to the position wherein the defocus values at the close point and the far point become equal to each other or the defocus value become the smallest at the intermediate point. If the above-described conventional adjustment standard is applied on the graph shown in FIG. 41, the best lens-to-bundle distance "P1" is approximately 625 micrometers.

On the other hand, if the focus or the image quality is evaluated by the observation of the actual operator, the evaluation distribution is as shown by the curve indicated by "H". The best lens-to-bundle distance "H1" by the visual evaluation, is approximately 600 μm. The present invention provides a method of optical focus adjustment by the use of human vision. In this embodiment, wherein the method in accordance with the present invention applies, the largest evaluation value occurs at the close point (a1), then the far point (c1) and the smallest evaluation value for the intermediate point is the smallest (b1). This shows that the image quality is most valued for the intermediate point, then the far point and finally the close point. The far point is more valued by the method in accordance with the present invention than conventional methods.

In this embodiment, the objective evaluation values are defined by the evaluation values provided by human vision. Each endoscope subjected to the adjustment is adjusted by moving the movable stage 233 to bring the evaluation values derived from examination processes to the objective evaluation values. The present invention also can provide the objective evaluation values wherein the close point gets more weight than the far point in image quality evaluation in the reverse of what was described in the previous mentioned embodiment.

In the graph of FIG. 41, when the lens-to-bundle distance is the value (approximately 575 μm) indicated by the point "P2", the evaluation value for the close point is greater than (a1), the evaluation value for the intermediate point is larger than (b1) and the evaluation value for the far point is smaller than (c1). Observing the levels of these values in relation to each other and the average value curvatures, (a), (b) and (c), the proper adjustment operation, whether increasing or decreasing, the lens-to-bundle distance, is self explanatory. In this embodiment, the value (a) becomes smaller by increasing the lens-to-bundle distance, the value (b) gets larger by increasing the distance and the value (c) becomes larger by the same distance increase. From this relationship among evaluation values, the lens-to-bundle distance should be increased to a larger distance than "P2" to improve the quality of the image or make the quantity of the defocus smaller. By repeating the above discussed operation, each evaluation value approaches the objective values (a1), (b1) and (c1) and finally the best lens-to-bundle distance "H1" can be reached.

The evaluation values (a), (b), and (c) in FIG. 41 include measurement errors ± alpha, which occurred during the measurement of the same lens-to-bundle. There is a possibility, therefore, that the lens-to-bundle distance may include errors as wide as the total error shown in the graph in the case of this embodiment.

The width of the error, is less than the width of the curve "H" or the human visual evaluation curve and is well within the allowance.

Figure 42:
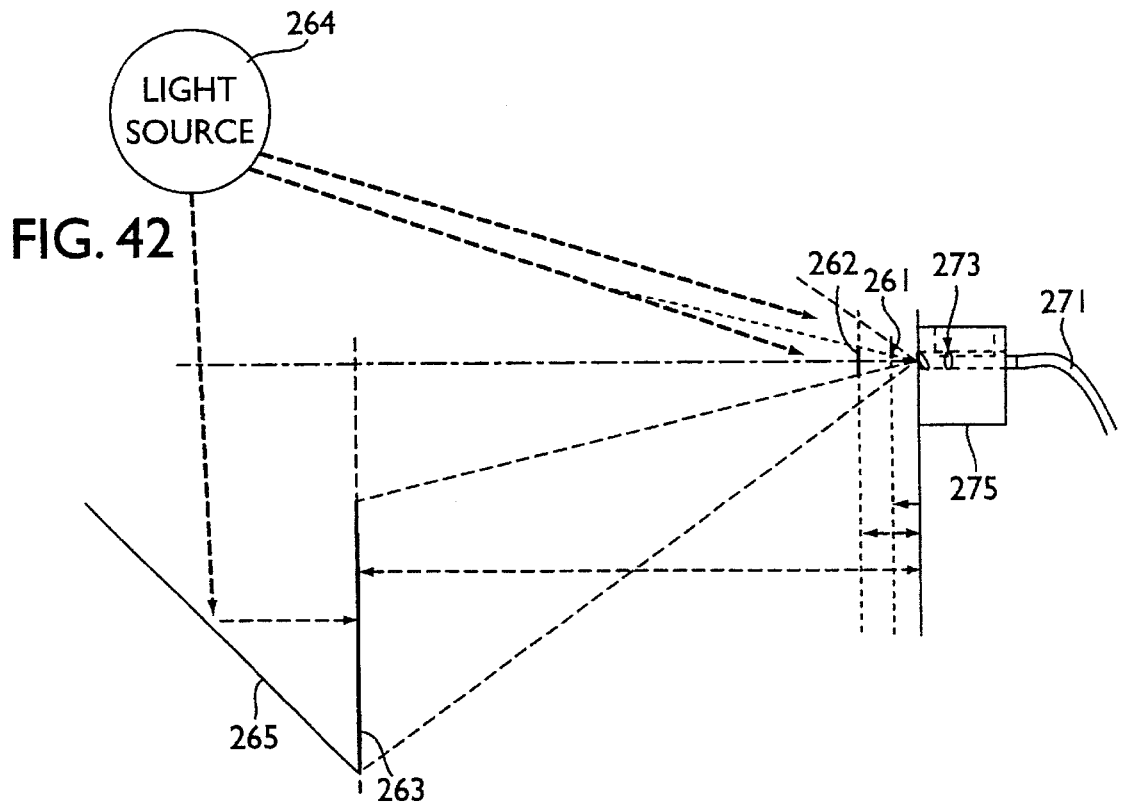
FIG. 42 is a schematic side view of an embodiment wherein the screen positioned in the object space are arranged not to form images to overlap to each other on the light receiving plane of an optical apparatus.
Figure 43:
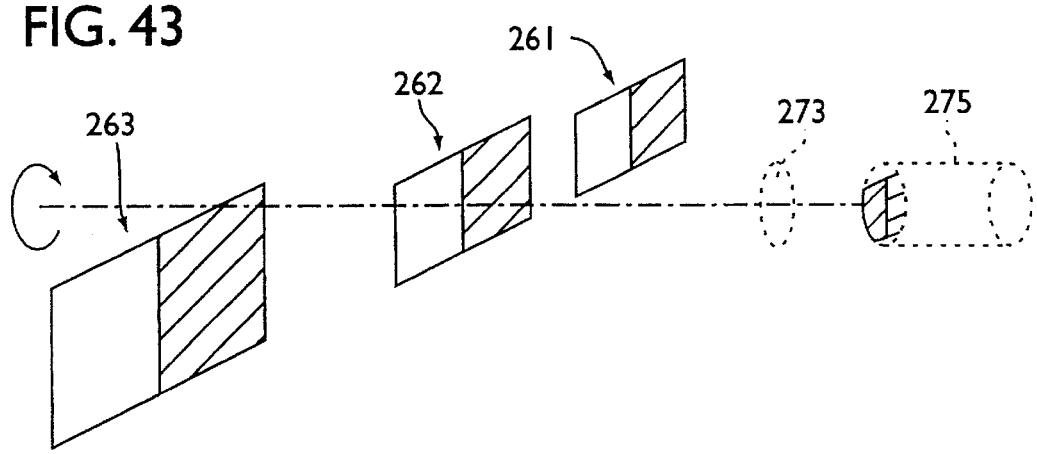
FIG. 43 is a perspective view to show the chart arrangement.

FIG. 42 is an embodiment of a separate screen arrangement wherein each screen for the close point, intermediate point or far point is separately provided and the images of these charts located at proper object distances are formed simultaneously on the focal plane of the optical system under examination. In this embodiment, the objective end of an optical fiber bundle 271 and a objective lens 273 are mounted on an endoscope assembly jig and an eyepiece lens 219, adapter 221, and a CCD camera 223, not shown in the drawing, are mounted on the observation end of the endoscope in a similar manner as the embodiment shown in FIGS. 35 and 36. The CCD camera is connected to an image quality or focus evaluation means which further comprises an image input/output apparatus 241, a computer 243, a display 245 and a TV monitor 247. Although not shown in detail in the drawing, the assembly jig includes a similar arrangement as to that of the precision travelling table shown in FIG. 36 which can adjust the distance between an objective lens 273 and the objective end of the optical fiber bundle.

In this embodiment, three screens 261, 262 and 263 are formed in sizes corresponding to the close, intermediate and far positions when positioned at their close point, intermediate point and far point, respectively. The center of screen 262 positioned at the intermediate distance matches with the optical axis and screens for the close point and far point, 261 and 263, respectively, are placed higher and lower than the optical axis, respectively. Screens 261, 262 and 263 are transparent or translucent, light and dark screens similar to screen 251 shown in FIG. 35.

An illumination light source 264 is positioned in back of the screens 261, 262 and 263 and at a predetermined distance from the optical axis. To keep the illumination light path length to the screens 261, 262 and 263 short and to keep the brightness of each screen at a same level, close distance screen 261 and the intermediate screen 262 are illuminated directly and the far distance screen 263 is illuminated indirectly with the reflected light by a mirror.

Figure 44:
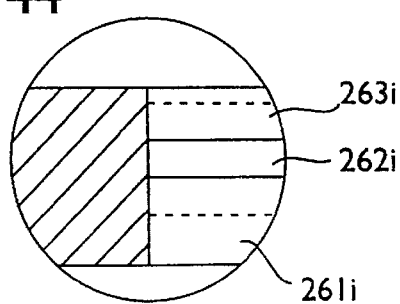
FIG. 44 is a schematic view of the image of each screen formed on the light receiving plane.

The images of the screens 261, 262 and 263 illuminated from the back by the light source 264 are formed on the objective end of the previously mentioned optical fiber bundle 271 through an objective lens 273. FIG. 44 shows the images formed on an end of the optical fiber bundle. The image 262$i$ of the intermediate distance screen 262 is formed approximately at the center of the focal plane and below the image 262$i$ is the image 261$i$ of the close distance screen 261. Above the image 262$i$ is the image 263$i$ of the far distance screen 263. These screen images 261$i$, 262$i$ and 263$i$ are photographed by a CCD camera 223 and then sampled in the horizontal direction. Averaging, light intensity distribution, differential curve and evaluation values are calculated for each image.

The focusing adjustment of a optical system being studied is conducted utilizing the evaluation value. Mounting the optical system of an endoscope on the adjustment apparatus, the evaluation values are then obtained, then, based on the evaluation values and the objective evaluation values obtained the optical fiber bundle 271 is then moved to adjust the focusing position.

The present invention is applied to an endoscope having an optical fiber bundle as its objective optical system in the embodiment shown in FIGS. 35 and 42 but the present invention can be applied to adjust the focus of an electronic endoscope having a photo-electric transducer device such as a CCD plate in place of an optical fiber bundle. The relationship of the CCD with an objective lens in this application is the same as the arrangement shown in FIG. 35.

Figure 45:
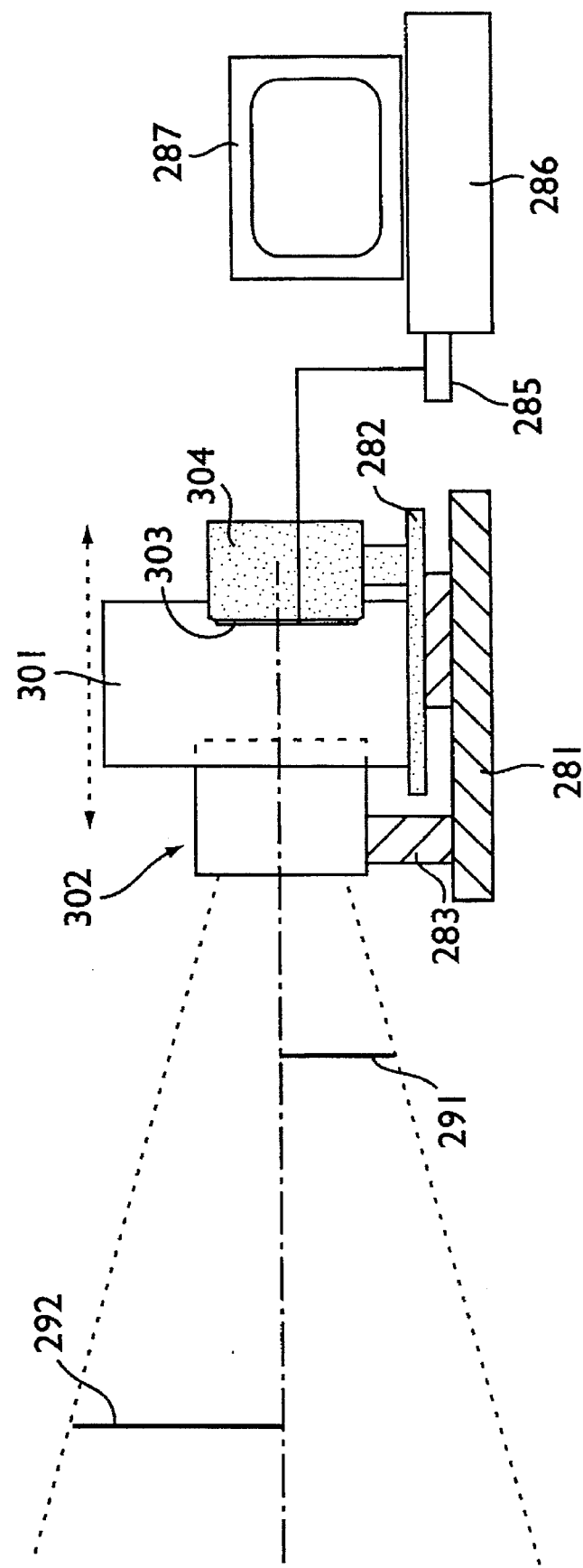
FIG. 45 is a side view of an embodiment wherein a fixed focus camera is adjusted in accordance with the present invention.
Figure 46:
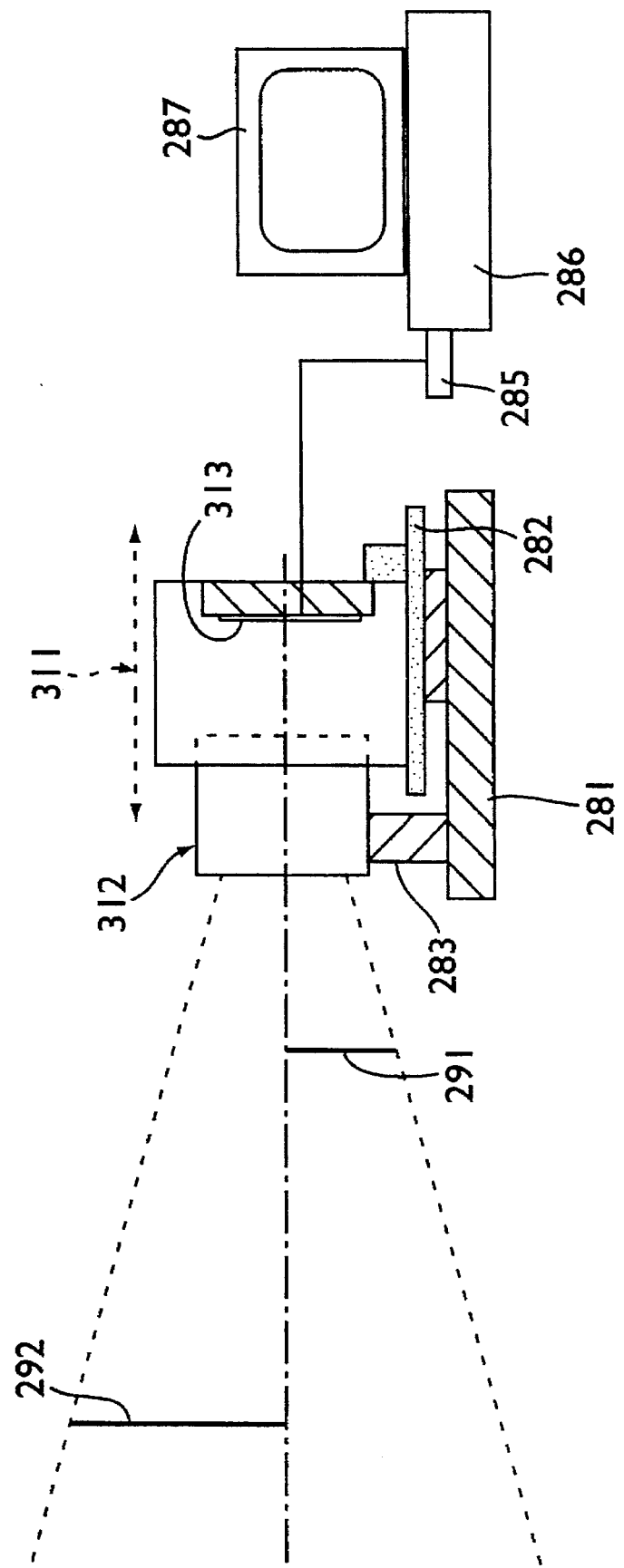
FIG. 46 is a side view of an embodiment wherein the focus of a fixed focus security camera is adjusted in accordance with the present invention.

FIGS. 45 and 46 show an application of the present invention to adjust the focus of a fixed focus lens camera during assembly. FIG. 45 is an example of the focus adjustment of a compact camera which uses a silver halide film. In this case the objective lens 302 is not yet attached to the camera body 301 and is longitudinally movable from the designed fixing position. In this example, the camera body 301 is mounted on a movable table 282 of a precision travelling table 281 and the objective lens is mounted on a fixture 283. The distance between the camera body 301, or film plane, and the objective lens 302 is adjusted by moving the moving table 282 towards and away from the fixture 283.

A CCD image detector is mounted inside the camera 301 with the camera back open. The light receiving face of the CCD image plate is positioned to coincide with the film plane of the camera 301 and fixed to the movable table 282 by a sensor support device.

In front of the objective lens 302, a close distance screen 291 and a far distance screen 292 are positioned. The patterns of the screens 291 and 292 are similar to that of the previously mentioned screen 251. In this embodiment the close point screen 291 is placed in a manner wherein the upper edge of the screen coincides with the optical axis O and the far point screen 292 is placed such that its lower edge coincides with the optical axis. By this arrangement, the image of the close point screen 291 is formed in the upper half of the focal plane and the far point screen is formed in the lower half of the focal plane.

The images of the screens 291 and 292 are formed on the CCD image plate 303 by the objective lens 302 and then converted into electric signals by the CCD image detector and transmitted to a computer 286 through an image input/output apparatus 285. Evaluation values are derived by the computer 286 and displayed on a display 287 in the form of a graph as shown in FIG. 41. By moving the camera body, the lens-to-film distance is changed for the focus adjustment based on the evaluation values derived from the close and far point screens in relation to the predetermined objective evaluation values.

FIG. 46 shows an embodiment wherein the present invention is applied to a security camera 310 having a CCD imaging device. The camera body 311 of the security camera 310 is mounted on a movable stage 282 in this embodiment and the objective lens 312 is fixed on the fixture 283. The focus is adjusted by moving the movable stage 282 to adjust the distance between the objective lens 312 and the CCD imaging device 313. The arrangement of the screens 291 and 292, the image input/output apparatus 385, the arrangement of the computer 286 and the display 287 and their operations are the same as shown in FIG. 45.

In the embodiments shown in FIGS. 45 and 46, the focus adjustment is conducted by obtaining evaluation values from the screens 291 and 292 placed at the close and far distance positions and adjusting the obtained evaluation values in relation to the preset objective evaluation values. A well balanced focusing adjustment from the close to the far distance positions can be achieved by using this method.

Although in the above-described embodiment, the defocus quantity of the screen image is evaluated by the light intensity distribution of the edge image, its derivative, and its standard deviation, however, the evaluation is not limited to this process. Other methods are also available. For instance, the optics under study can be evaluated by the quantity of defocus. Setting of the objective evaluation values can be done by having one or more standard optics and determine the objective values on the values obtained by human vision through the lens-to-bundle distance adjustment of the standard optics. The objective evaluation values can be of course obtained from the optical design by calculating the lens-to-bundle distance.

Figure 47:
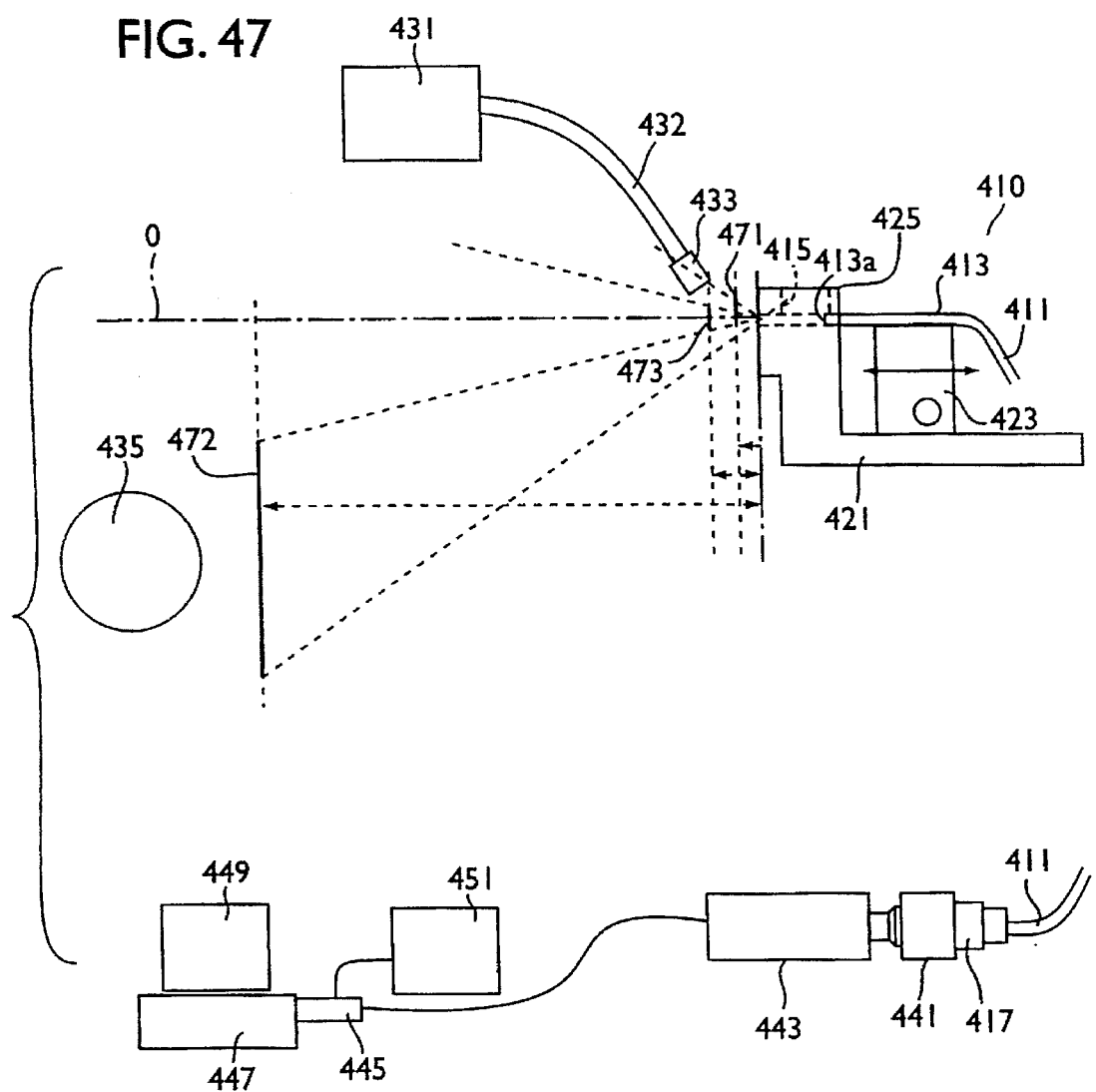
FIG. 47 shows side views of an embodiment of the evaluation apparatus wherein the focus evaluation method and the focus adjustment method in accordance with the present invention are applied.
Figure 50:
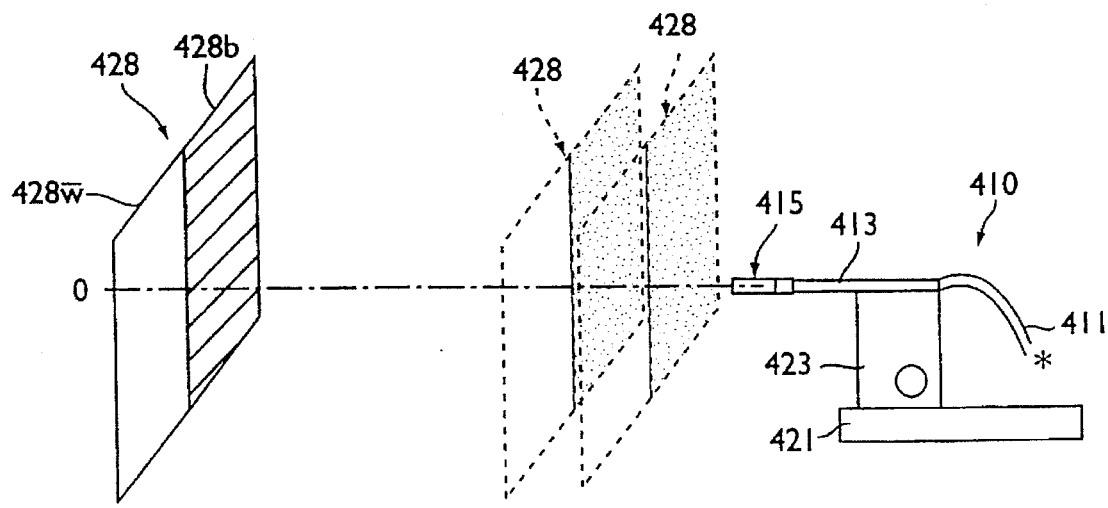
FIG. 50 is a schematic view of an example of the evaluation apparatus which applies the focus evaluation method in accordance with the present invention.

An embodiment in accordance with the present invention wherein yet another method to evaluate and adjust the focus of an optical system and the apparatus to which it is applied will be described with accompanying drawings. FIG. 47 shows a method and an apparatus for the adjustment of focus. FIG. 50 is yet another example to apply a method and an apparatus in accordance with the present invention. FIG.

47 shows a focus adjustment apparatus wherein the state of focus of an objective lens 415 of an endoscope 410, which is under examination, and the focus is adjusted based on the obtained evaluation values. FIG. 50 shows an optical evaluation apparatus wherein the state of focus of an objective lens 415 of an endoscope 410 is evaluated. It is obvious that the present invention can be applied to other optical systems, other than endoscopes.

The major components of the above-mentioned embodiment will be described with reference to FIG. 47. The front end 413 of the optical fiber bundle 411 of an endoscope 410 is mounted on a precision travelling table 421 and moves in the direction perpendicular to its entrance face 413a. The objective lens 415 which is mounted inside the front end 413 and further held by an objective lens fixture 425 which is attached to the same base as the precision travelling table. Having described the arrangement, the distance between the objective lens 415 and the entrance face 413a can be adjusted by moving the movable table 423. The objective lens is mounted to a sliding tube, not shown, fitted to the front end 413. In other words, the objective lens is fixed on the front end by the sliding tube.

Figure 48:
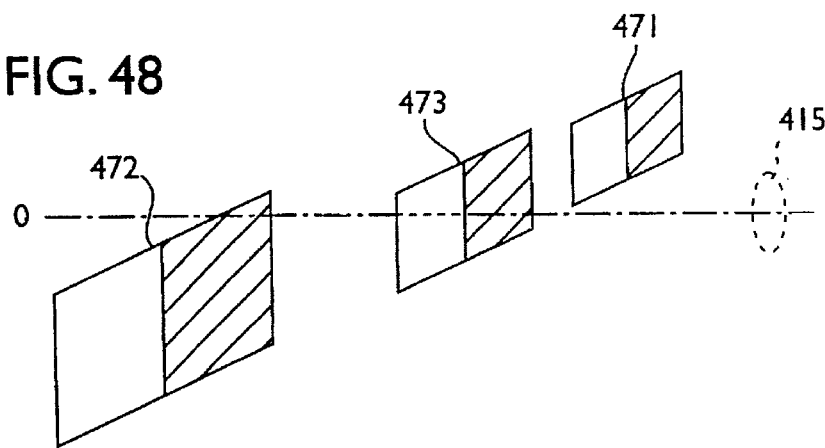
FIG. 48 is a perspective view to show the arrangement of the chart board of said evaluation apparatus.

Three screens 471, 472, 473 are positioned at separate object distances in the object space in front of the objective lens 415 and the images of the three charts are formed on the entrance face 413a simultaneously. The screen 471 positioned at the closest distance to the objective lens is placed above the optical axis O. The screen 472 positioned at the farthest position from the objective lens is placed below the optical axis and the screen 473 positioned between the above-mentioned two screens is placed on the optical axis coinciding its center and having its face perpendicular to the optical axis. The close distance screen 471 and the far distance screen 473 are positioned on both sides at the position where the best focus is required. The screens 471-473 are, as shown in FIG. 48, rectangular shaped screens having their faces separated vertically at their center by an opal translucent area and an opaque light buffing area. The form of said screen is not limited though to the above-described example.

The close and intermediate distance screen 471 and 473, respectively, are illuminated by a light source 431 while the far distance screen 472 is illuminated by a light source 435. The emitted illumination light from the light source 431 towers along the optical fiber bundle 432 and illuminates the close and intermediate chart boards 471 and 473 respectively through an illumination optics 433. The light source 435 illuminates the far distance screen 472 from behind. The illumination means is not limited to those illustrated above and any type of illumination which can illuminate the screens 471, 472 and 473 is applicable.

Figure 49:
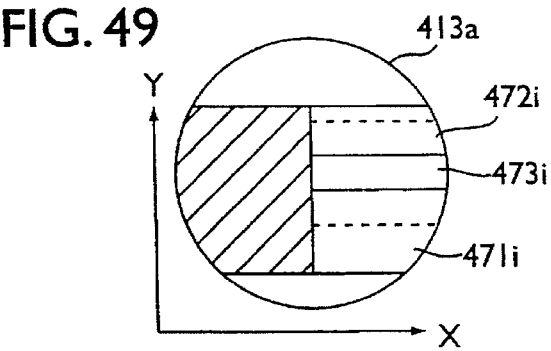
FIG. 49 is a schematic view of an image of the chart board focused by the subjected endoscope mounted on the evaluation apparatus.

The chart images 471i, 472i, and 473i of the screens 471, 472 and 473 respectively which are illuminated by the light sources 431 and 435 are formed at lower, upper and central areas, in relation to the optical axis approximately of the entrance face 413a of the front end by the objective lens 415 as shown in FIG. 49.

The screen images 471i, 472i and 473i formed on the entrance face 413a are transferred through the optical fiber bundle 411 and transmitted from an eyepiece fixed on the other end of the optical fiber bundle 411. The eyepiece lens 417 is connected to a CCD camera 443 through a connector 441 and therein the images formed on the entrance face 413a are photographed. The photographed images by the CCD camera 443 are transmitted to a computer and arithmetic operational means through an image input/output interface apparatus 445.

The above-mentioned computer 447, as explained in a previous embodiment with accompanying drawing FIG. 38, samples the images of close, far and intermediate screens 471, 472 and 473, respectively, in horizontal direction or along the X coordinate axis or abscissa. The light intensity distribution derived from the sampled data expressed, for example, in a light intensity distribution curve has points of sharp inflection at the border of light and dark areas in the focused state.

A rate of change at the border between the light and dark areas can be obtained by differentiating the light intensity distribution curve. From the information of the height or foot width of said rate of change curve, evaluation values of the focus can be obtained. Incidentally, FIGS. 38(A), 38(B), 39(A) and 39(B) show the states of focus. FIGS. 38(A) and 39(A) show the out of focus state and FIGS. 38(B) and 39(B) show the in focus state.

Figure 51:
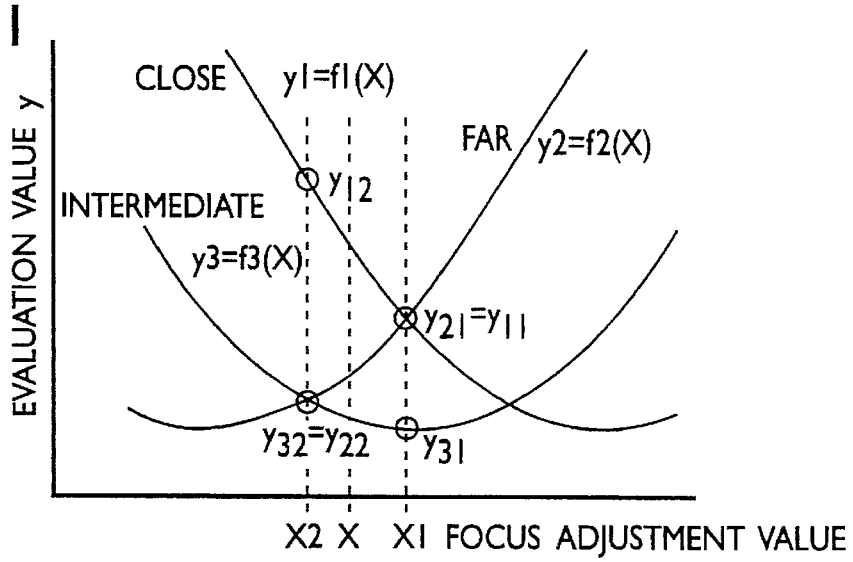
FIG. 51 shows graphs wherein the relationship of the evaluation value of the subjected endoscope is evaluated by the method of the present invention.

The focus evaluation values can be obtained from each of screen 471, 472 and 473. The focus adjustment distance can be changed herein by moving the front end 413 of the optical fiber bundle in relation to the objective lens 415 to change the distance between the entrance face 413a and the objective lens 415. At each different focus adjustment position, the arithmetic operation is repeated to calculate of the focus evaluation values corresponding to each screen 471, 472 and 473. The resultant evaluation values are displayed in the form of graphs as shown in FIG. 51, on a display or on a monitor TV.

FIG. 50 illustrates an evaluation apparatus which applies a single screen 428 which can be moved to close, intermediate, and far object adjusting which differs from the apparatus shown in FIG. 47 which applies three unmoving screens 471, 472 and 473. Other arrangements with the evaluation apparatus are similar to the apparatus shown in FIG. 47 having an eyepiece 417 fixed on the other end of the optical fiber bundle 411 as shown in FIG. 47, and the eyepiece lens 417 further connected to a CCD camera 443 through an adapter 441. The image photographed by the CCD camera 443 is transmitted to a computer 447 through an image input/output interface apparatus.

Yet another embodiment relating to a focus evaluation method and a focus adjustment method in accordance with the present invention wherein an apparatus shown in FIG. 47 is applied will be discussed further with accompanying FIGS. 51 to 59.

In this embodiment, images 471i, 472i and 473i of the close distance, far distance and intermediate distance screens 471, 472 and 473 respectively, are photographed several times by the CCD camera changing the distance between the objective lens 415 and the entrance face 413a or the quantity of the focus adjustment and focus evaluation values are computed for each quantity of focus adjustment. FIG. 51 shows the resultant evaluation value curve wherein X coordinate axis represents the extent of the focus adjustment and Y coordinate axis represents the focus evaluation value. The evaluation value curve tells that the smaller the value on Y coordinate, the higher is the evaluation.

The curve of the evaluation values corresponding to the close distance screen 471 is defined by y1=f1(x), the curve of the evaluation values corresponding to the far distance chart board 472 is defined by y2=f2(x); and the curve of the evaluation values corresponding to the intermediate distance chart board 473 is defined by y3=f3(x). The position of the intermediate chart board herein is located at the best focus position or its close neighborhood.

The favorite quantity of the focus adjustment to be used in an endoscope 410 by the users resides between the intersecting point $(x1, Y_{21}=Y_{11})$ of the close distance evaluation value curve and the far distance evaluation value curve and the intersecting point $(x2, Y_{22}=Y_{32})$ of the intermediate evaluation value curve and the far distance evaluation value curve. Paying attention to this region, the present invention obtains the interval [x2, x1] between the above-mentioned intersecting points on the x coordinate axis from evaluation value curves y1=f1(x), y2=f2(x), y3=f3(x) by computation. In other words, points of focus adjustment values x1 and x2 are located by the arithmetic operations which can define the following equations:

f1(x)=f2(x), and f2(x)=f3(x).

The above-described equations show that the desirable focus adjustment value x is included in the interval [x2, x1]. By limiting the focus adjustment to this interval [x2, x1], focus evaluation and adjustment procedures of the optical system under evaluation are made easier and quicker.

In this one embodiment in accordance with the present invention, the overall focus evaluation value "S" is obtained from the focus adjustment value within the interval [x2, x1]. If the overall evaluation value "S" is defined, the focus adjustment value x can be derived from the value "S" during the calculation.

Figure 52:
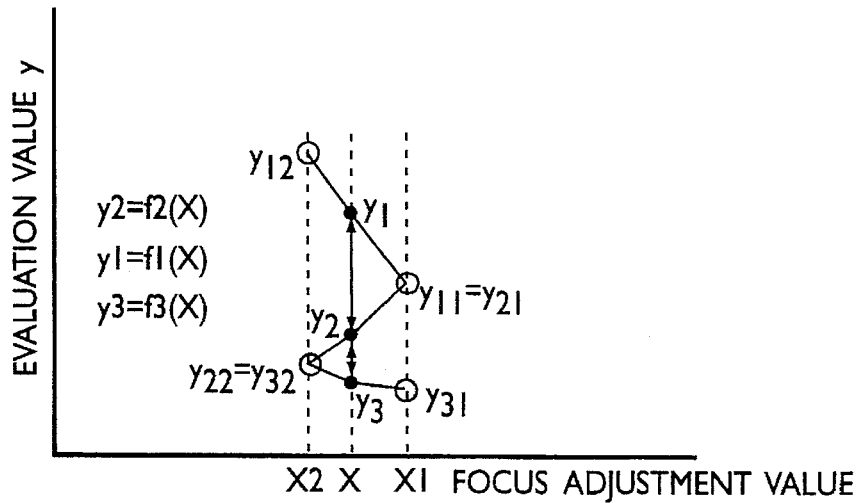
FIG. 52 is a graph to show the relationship between the evaluation value and the focus adjustment value of the subjected endoscope.

The method to derive the overall evaluation value "S" from the focus adjustment value x will be discussed by referring to FIGS. 51 through 53. Once the focus adjustment value x is defined, focus evaluation values y1, y2 and y3 corresponding to each screen 471, 472, 473 can be calculated. The overall evaluation value "S" is obtained by a function "g" which includes three evaluation values y1, y2, y3 as a function $S=g_n(y1, y2, y3)$. The function "g" can be defined as follows:

$g_1 = (y1 - y2)/(y2 - y3)$     1-1
$g_2 = (y2 - y3)/(y1 - y3)$     1-2
$g_3 = y3/y2 - y2/y1$     1-3

The overall evaluation value "S" can be obtained by above-described overall evaluation function S=g(y1, y2, y3), provided the focus adjustment value is x.

The present invention allows the application of function g (y1, y2, y3) having y1, y2, y3 relationships other than those defined by the above-described functions 1-1, 1-2, and 1-3.

Although three screens 471, 472 and 473 are applied above, the present invention is not limited to this example. Two, four, and more than four screens can be applied. Provided that the number of the screen is N (an integer 2 or more than 2), the evaluation value $Y_n$ (n=1 to N) can be calculated on screen and the overall evaluation value "S" can be obtained by overall evaluation value function $S=g(y_1, y_2 \ldots, y_n, \ldots, y_N)$ with N number of evaluation values $y_n$.

The above-described is a method wherein an overall evaluation value "S" is derived from a particular focus adjustment value x. Focus adjustment value x can be derived from an overall evaluation value "S" obtained beforehand as a desirable overall evaluation value by reversing the operational procedures described above. For example, the desirable overall evaluation value can be obtained by applying focus adjustment to a standard optical system and a standard subject, e.g., a human subject. The overall evaluation value obtained is defined as a standard overall evaluation value "$S_o$", and an objective focus adjustment value $x_o$ can be obtained by computation based on the standard overall evaluation value "$S_o$". Then the focus adjustment of the subjected endoscope 410, for instance, is conducted by applying the objective evaluation value obtained by the calculation described above.

A focus adjustment method wherein the focus adjustment of endoscope 410 being evaluated corresponds to a standard optical system, applying the standard overall evaluation value "$S_o$" will be discussed below. The only known data is the standard overall evaluation value. Firstly, by changing the focus adjustment value x of subjected endoscope 410, evaluation values y1, y2 and y3 corresponding to each of screens 471, 472 and 473 at different focus adjustment values x are obtained.

Based on this evaluation, values y1, y2 and y3 are thus obtained. Focus adjustment values x1 and x2 of the focus adjustment interval are defined and at the same time, functions f1, f2 and f3 corresponding to each screen 471, 472 and 473 respectively located within the focus adjustment interval [x2, x1] are calculated.

Once the functions f1, f2 and f3 are defined, the focus adjustment value x, which satisfies $g(x)=S_o$, is reversely calculated and the objective focus evaluation value $x_o$ can be obtained. Having the objective focus adjustment value $x_o$, the focus adjustment procedures of endoscope being studied can be conducted.

It is obvious herein, that the overall evaluation value function "g" which is applied to obtain the standard overall evaluation value "$S_o$" and the overall evaluation value function "g" which is applied to reversely calculate the objective focus value $x_o$ must be the same.

Said focus adjustment interval [x2, x1] which is applied to obtain the function f is not necessarily in the range between the intersecting point of the far distance evaluation value and the close distance evaluation value, and the intersecting point of the intermediate distance evaluation value and far distance evaluation value. For example, the interval of the endoscope being studied can be [x2', x1'] as shown in FIG. 53 wherein $y_{32}'$ not equal $y_{22}'$, $y_{11}'$ not equal $y_{21}'$.

Figure 53:
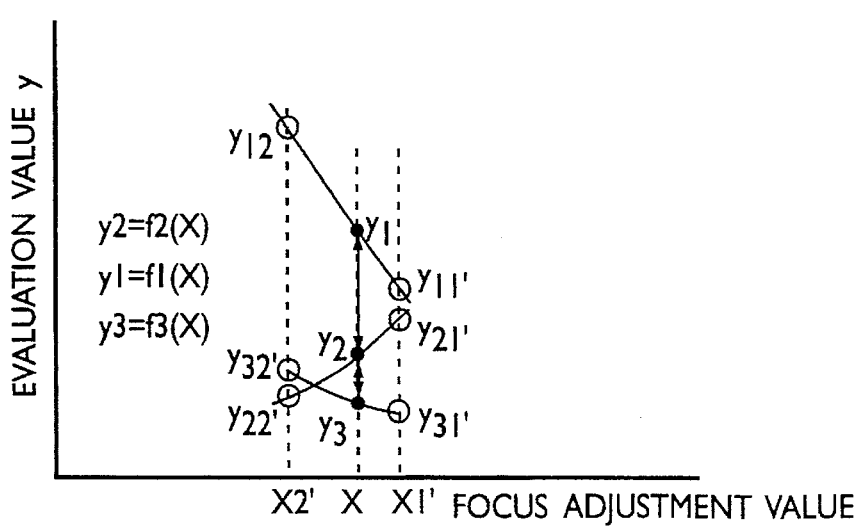
FIG. 53 is a graph to show the relationship between the evaluation value and the focus adjustment value of the subjected endoscope.

The function f can be defined even in the case of the interval [x2', x1'] shown in FIG. 53 and therefore, the overall evaluation value "S" can be applied. The function "f" shown in FIG. 53 is the same function "f" shown in FIG. 51 despite the difference of the intervals.

According to the focus adjustment method provided by the present invention, a focus adjustment value can be obtained wherein the overall evaluation value "S" becomes equal to the standard overall evaluation value "$S_o$", even in the case where the evaluation value curves of the close distance, far distance, and intermediate distance are not the same with their performance. Therefore, the focuses of far distance and close distance of the subjected lens 415 can make a good balance between them.

According to the afore-described focus adjustment method, the function f is obtained by changing the focus adjustment value x within a predetermined interval. With this adjustment method the evaluation values y1, y2, y3 are calculated at numerous points within the interval and therefore the precision of the procedure increases, but the procedure consumes a rather long time.

Figure 54:
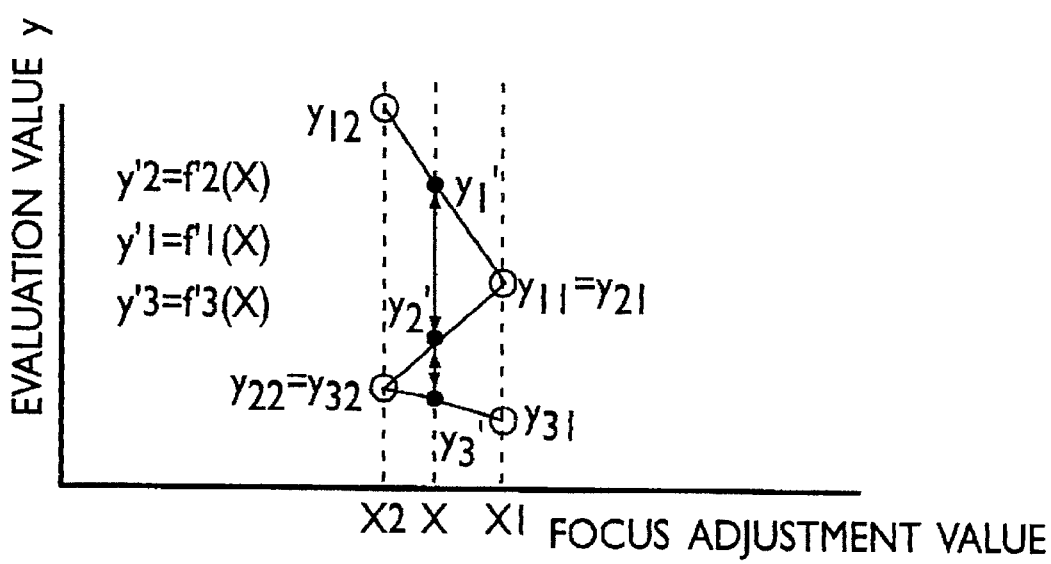
FIG. 54 is a graph wherein evaluation values within the interval $[x_2, x_1]$ are approximated linearly in accordance with FIG. 52.
Figure 55:
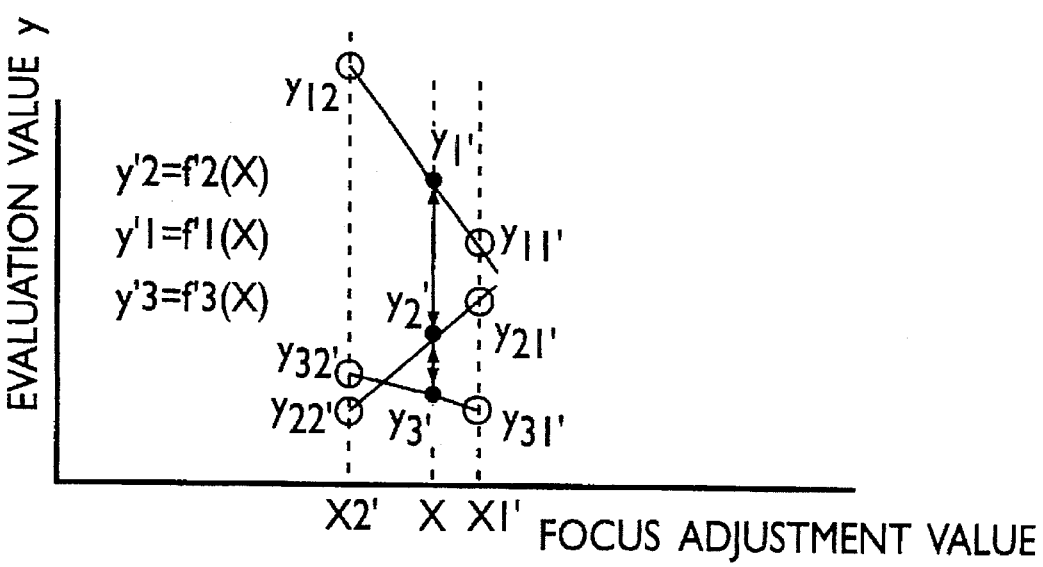
FIG. 55 is a graph wherein evaluation values within the interval $[x_2, x_1]$ are approximated linearly in accordance with FIG. 53.
Figure 56:
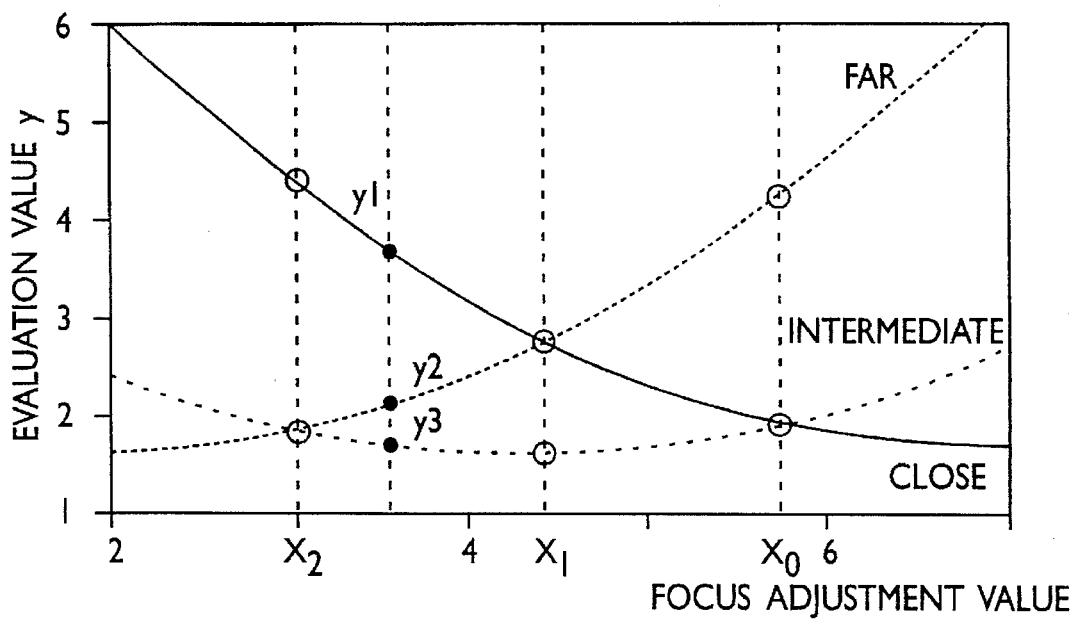
FIG. 56 is a graph to show the relationship of the evaluation value of the subjected endoscope and the focus adjustment value, evaluated by the method of the present invention.

Referring to FIGS. 54 and 55, the following embodiment shows, a method wherein the precision is maintained within allowable levels while the focus adjustment time is decreased.

FIGS. 54 and 55 show a graph wherein the focus adjustment interval [x2, x1] is approximated to a straight line based on the evaluation value data obtained from FIG. 51. The evaluation values y1, y2 and y3 herein are not calculated by changing the focus adjustment value x within a focus adjustment interval [x2, x1] but the evaluation values y1, y2 and y3 located at both ends of the interval [x2, x1] are connected by straight lines instead. The straight lines are utilized as approximated formula of the aforementioned function "f". For example, in FIG. 54, a straight line is determined between 2 points (x1, $y_{11}$) and (x2, $y_{12}$). By this approximation a function f' is obtained. In a similar manner, the functions f2' and f3' can be obtained.

Once functions f1', f2' and f3' are determined, the focus adjustment objective value $x_o$ can be obtained by inversely calculating the focus adjustment value x which satisfies a equation $g(x)=S_o$, and the focus adjustment of the endoscope being studied can be conducted based on that value.

In this method also, as shown in FIG. 55, it is not necessary to determine the focus adjustment interval wherein the evaluation values y1', y2' and y3' coincide with each other. If the interval becomes too wide then the difference between the actual and approximated curves deviates more than allowed and the accuracy cannot be kept at the same level. As long as the interval from the line x=x2' to the line x=x1' is at illustrated level of this embodiment, the values are within the allowance. The method of calculating the overall evaluation value "S" and to calculate the focus adjustment value in inverse operations are the same as shown in FIGS. 51 to 53.

An example of the focus evaluation method will be described below. The method is applied to an apparatus wherein the focus adjustment is completed and an image forming lens is fixed and therefore, an apparatus shown in FIGS. 47 and 50 is applied in place of afore-described focus adjustment apparatus 421, 423.

Figure 57:
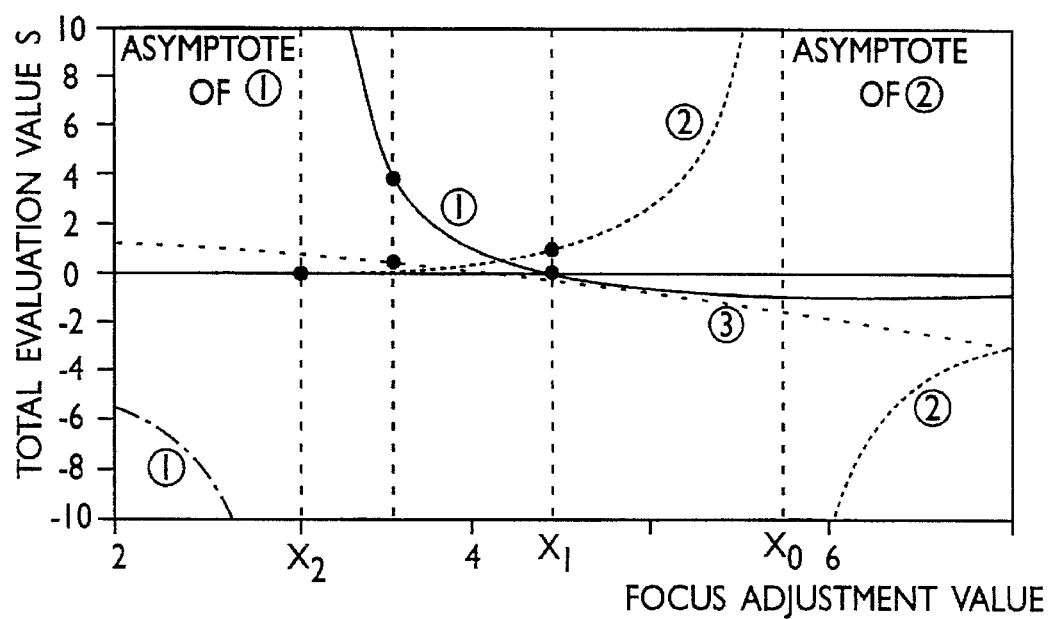
FIG. 57 is a graph to show the relationship of the overall evaluation value derived from the evaluation values and the focus adjustment value.
Figure 58:
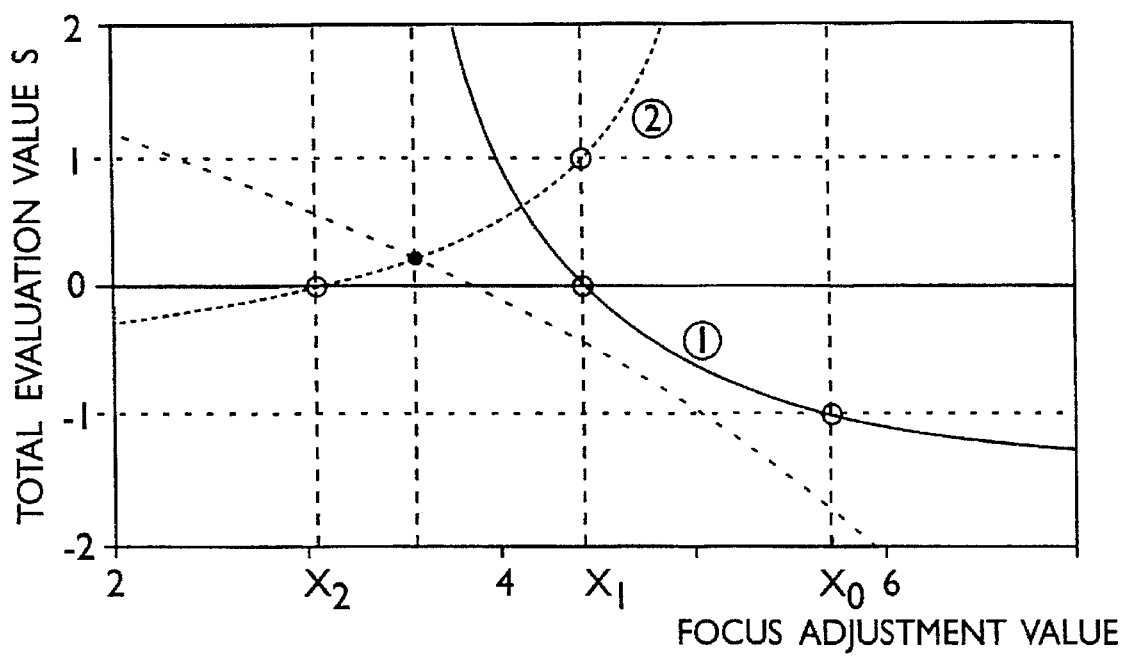
FIG. 58 is a graph wherein the vertical axis or the ordinate axis is expanded; and, FIG. 59 is yet another graph to show the relationship of the evaluation value of the subjected endoscope and the focus adjustment value, evaluated by the method of the present invention.

In this focus evaluation method, a function f cannot be obtained directly. However, evaluation values y1, y2 and y3 are obtainable, and therefore, the overall evaluation value "S" can be calculated. Comparing the standard overall evaluation value "$S_o$" applied in focus adjustment and the overall evaluation value "S" obtained in this method, the focusing of the subjected optical system can be judged whether properly focused or not. FIGS. 57 and 58 are graphs to show the relationship of the focus adjustment value x and the overall evaluation value "S" wherein formulas 1-1, 1-2 and 1-3 (i.e., (1), (2) and (3), respectively), are applied as the function "g" whereby the overall evaluation value are calculated.

Figure 59:
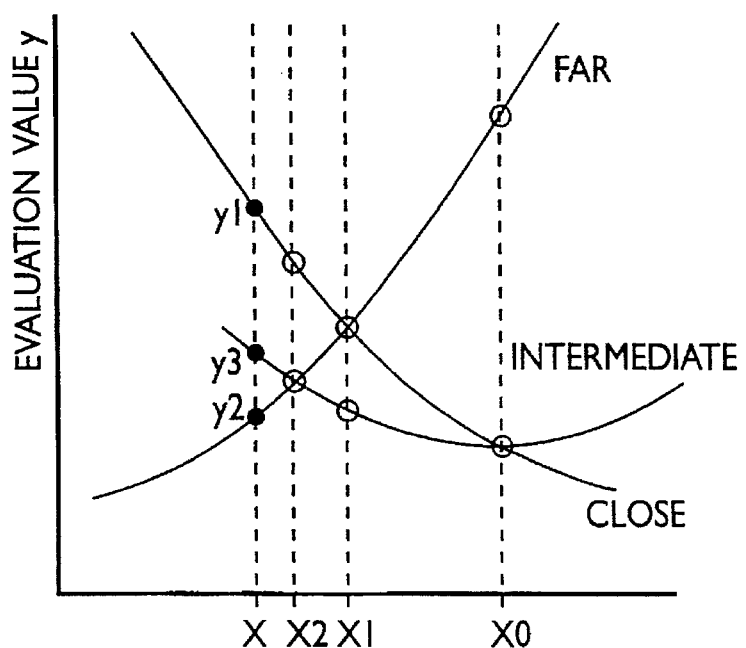

The overall evaluation value "S" calculated by formula 1-1 plots as a hyperbolic curve having an asymptotic line $x=x_2$, if $x>x_o$ then $S<-1$ if $x=x_o$ then $S=-1$ if $x_1>x>x_o$ then $0>S>-1$ if $x=x_1$ then $S=0$ if $x_1>x>x_2$ then $S>0$ if $x_1<x_2$ then $S<0$ The overall evaluation value "S" calculated by formula 1-2 becomes hyperbolic curves having an asymptotic line $x=x_2$, equations are due to graphical codes are invalued.

if $x>x_o$ then $S<0$ if $x=x_1$ then $S=1$ if $x_1>x>x_o$ then $S>0$ if $x=x_2$ then $S=0$ if $x_1>x>x_2$ then $S>0$ if $x_1<x_2$ then $S<0$ When the formula 1-3 is applied, the overall evaluation value "S" becomes a negative gradient function and takes approximately S=0.5 at $x_2$ and S=−0.4 at $x_1$. If the allowance range of the overall evaluation value "S" is set at 0.3 to −0.2, and the evaluation value y1, y2 and y3 is at those dot marked values as shown in FIG. 59, then overall evaluation value is located at S=0.2 and the focus adjustment of the optical system being studied can be judged well within the allowable range.

The function "g" is applied for both focus adjustment and focus evaluation purposes, similarly as described before, the same applies for the arrangement of the screen positions.

In the above-described embodiment, the intermediate distance screen is positioned at the best focus position. The intermediate distance screen is positioned anywhere between the far distance chart and the close distance chart. In other words, it can be positioned close to either of the far or close distance screens. FIG. 59 shows the evaluation value in such a case. Although, in this case the focus adjustment value x which determines the standard overall evaluation value "$S_o$" is outside of the interval [x2, x1], the described function "g" which is located within the interval [x2, x1] can be extended outside of this interval. When formula 1-2 is applied as the function "g", the standard evaluation value "$S_o$" becomes negative. Applying the above explained method focus adjustment an evaluation can be conducted based on the negative "$S_o$".

As shown in this embodiment, the focus is adjusted or evaluated based on an overall evaluation value which is derived from three evaluation points for close, far and intermediate screen positions. In this method, a stable and proper focus adjustment and focus evaluation can be achieved, even when the three evaluation values of the subjected optical system being studied are outside of the standard valuation value range.

The present invention provides an apparatus which evaluates subjected optical systems regardless of their types, because it is not influenced by the image magnifications. It also provides a short operational period by deriving the evaluation value from the operation of differentiating edge images to obtain an LSF (line spread function).

The present invention provides an apparatus which evaluates the optical system under investigation regardless of its type, because it is not influenced by the image magnification. It also can shorten the evaluation time by calculating the evaluation value through the mathematical process of differentiating edge images to obtain the LSF (line spread function).

The present invention, provides a method to evaluate and adjust the focus in short time of optical systems which have a repeated noise pattern such as that repeated by an optical fiber bundle, without the interim being influenced by such a repeated pattern.

A preferred embodiment, in accordance with the present invention, provides a screen apparatus which can enable the focus adjustment of an optical system and an evaluation of the image quality at different object distances, to be done simply and quickly, without being influenced by a variation of the image magnification or asymmetric structure of optical system under study and therefore simply obtaining required chart images.

The present invention provides a method to evaluate a well-balanced focus of the fixed focus optical system from a far distance to a close distance by setting separate objective values for the defocus images of the chart elements positioned at different object distances, and adjusting the focus to bring the measured quantity of defocus towards the previously determined objective value.

The present invention further provides a method and an apparatus which can evaluate the focus or image quality at certain levels and makes allowances even if the lenses being studied have varying optical performances, by deriving one overall evaluation value from a number of evaluation values calculated by each screen means located at different object distances.

Further, the present invention provides a method to evaluate the focus within a short time by calculating an overall evaluation value from three screens positioned at different object distances.

Still further, the present invention provides a method to evaluate and adjust the focus of the optical system being studied to be well-balanced from the far to the close object distance and to choose the best focus point simply and easily, by obtaining a number of focus evaluation values from a number of screen means positioned at a number of different object distances and adjusting the focus of the optical system being studied by deriving a focus adjustment objective value or the quantity or range of focus adjustment through calculation of a standard overall evaluation value which is further derived from a number of focus evaluation values and from an actual overall evaluation value of the optical system being studied. Further yet, the present invention provides a method to adjust the best focus position through simple procedures, by obtaining the focus adjustment objective value by calculation using three screens positioned at different object distances.

We claim:

1. An optical focus evaluation method comprising:
   forming an edge image through an optical system under examination on light receiving means;
   sampling a distribution of light intensity for an image formed on said light receiving means in a direction substantially perpendicular to said edge image;
   calculating a line spread function by differentiating said distribution of light intensity in a sampling direction; and
   calculating a plurality of edge image evaluation values based on said line spread function,
   wherein the plurality of edge image evaluation values comprise a width of said line spread function which includes a distance between two points on a line spread function curve, one of said points located on each side of a peak.

2. The optical focus evaluation method according to claim 1, further comprising calculating a line spread function by differentiating a set of electric signals related to a distribution of a brightness intensity of the edge image and sampled in a sampling direction.

3. An optical focus evaluation method according to claim 1, further comprising locating an image plane at an optimum evaluation position, the optimum evaluation position determined as a position where said edge image evaluation value takes a minimum value when said light receiving means is moved along an optical axis of an optical system under evaluation.

4. An optical focus evaluation method according to claim 1, wherein said evaluation method further comprises placing a screen apparatus at a specific position in an object space.

5. An optical focus evaluation method according to claim 1, wherein said plurality of evaluation values comprise a calculated standard deviation of said line spread function.

6. An optical focus evaluation method according to claim 1, wherein said width is a distance between two sampling points comprising a ½ peak value of said line spread function peak value.

7. An optical focus evaluation method comprising:
   positioning a light receiving means at a predetermined location where an image surface of an optical system under evaluation is assumed to be located;
   placing first and second screen plates at respective positions that are optically conjugate with first and second positions, the first and second positions being spaced from the predetermined location, the first and second positions being spaced equal distances from the predetermined position and in opposite directions along an optical axis of the optical system;
   providing an edge image pattern on each of the first and second screen plates;
   sampling a light intensity distribution of an image of the first screen plate in a direction perpendicular to a direction along which the edge image pattern of the first screen plate extends;
   sampling a light intensity distribution of an image of the second screen plate in a direction perpendicular to a direction along which the edge image pattern of the second screen plate extends; and
   determining an optimum position for the image surface in accordance with sampling data obtained during sampling of the light intensity distribution of an image of the first and second screen plates.

8. An optical focus evaluation method according to claim 7, wherein said respective first and second positions correspond to a far point and a near point from said optical system to be inspected, and said far and near points observable through said optical system.

9. The optical focus evaluation method according to claim 7, further comprising:
   calculating an evaluation value by the first and second sampled data;
   moving the light receiving means along the optical axis;
   determining the specific position for the light receiving means where the evaluation values from the first and second sampled data become equal; and
   determining the optimum position of the image surface in accordance with the specific position of the light receiving means.

10. An optical evaluation method for evaluating an optical system, the optical system including an optical element having a predefined arrangement, comprising:
    providing a screen apparatus including an image pattern having a one-dimensional brightness contrast in an object space of the optical system under evaluation;
    positioning a light receiving means at an assumed location for an image plane of the optical system;
    sampling an intensity distribution of an image of the screen apparatus on the light receiving means in a direction of a contrast change and collecting data associated with the sampling;
    averaging the sampling data to obtain one-dimensional gradient data; and
    conducting a predetermined arithmetic operation in accordance with the one-dimensional gradient data.

11. An optical evaluation method according to claim 10, further comprising placing a low pass filter between said light receiving means and said optical element such that the noise produced by the repeated pattern of said optical element is filtered out.

12. An optical evaluation method according to claim 10, wherein said image of said screen apparatus comprises an edge image.

13. An optical evaluation method according to claim 10, said predetermined arithmetic operation comprising calculating an evaluation value in accordance with the one-dimensional gradient data.

14. An optical focus evaluation method according to claim 10, said predetermined arithmetic operation comprising differentiating the one-dimensional gradient data to calculate a line spread function and calculating an evaluation value based on said line spread function.

15. An optical evaluation method according to claim 10, wherein said screen apparatus comprises an image including a straight line.

16. An optical evaluation method according to claim 14, further comprises calculating a modulation transfer function through Fourier conversion of said line spread function.

17. An optical evaluation method according to claim 14, comprising calculating a standard deviation of said line spread function.

18. An optical evaluation method according to claim 14, wherein the evaluation value, calculated in accordance with the line spread function, is a width of the line spread function.

19. An optical focus evaluation apparatus comprising:
   optical image forming means for forming an edge image through an optical system under examination on means for receiving light;
   means for sampling a distribution of light intensity for an image formed on said light receiving means in a direction substantially perpendicular to said edge image;
   means for calculating a line spread function by differentiating said distribution of light intensity in a sampling direction; and
   means for calculating a plurality of edge image evaluation values based on said line spread function,
   wherein the plurality of edge image evaluation values comprise a width of said line spread function which includes a distance between two points on a line spread function curve, one of said points located on each side of a peak.

20. An optical focus evaluation apparatus comprising:
   optical image forming means for forming an edge image through an optical system under evaluation on means for receiving light;
   means for sampling a distribution of light intensity for an image formed on said light receiving means in a direction substantially perpendicular to said edge image;
   means for calculating a line spread function by differentiating said distribution of light intensity in a sampling direction; and
   means for calculating a plurality of edge image evaluation values based on said line spread function,
   wherein said plurality of evaluation values comprise a calculated standard deviation of said line spread function.

21. A screen apparatus, comprising:
   a plurality of screen elements;
   an optical system for forming an image of each of said plurality of screen elements on a plane of observation located at a predetermined distance from said optical system;
   each of said plurality of screen elements located at different object distances; and
   said optical system simultaneously forming said images of each of said screen elements on said observation plane located at said predetermined distance from said optical system.

22. A screen apparatus according to claim 21, wherein at least two of said plurality of screen elements are placed at an assumed object distance such that said images of said at least two of said plurality of screen elements formed by said optical system comprises equal defocus values on said observation plane.

23. A screen apparatus according to claim 21, wherein at least one of said plurality of screen elements is placed at an assumed object distance such that said image of said at least one of said plurality of screen elements formed by said optical system comprises a best image on said observation plane.

24. A screen apparatus according to claim 21, wherein each of said plurality of screen elements comprises a screen plate including a screen image pattern having a brightness contrast variation in a single direction.

25. A screen apparatus according to claim 24, wherein said screen image pattern comprises an edge having a brightness border line.

26. A screen apparatus according to claim 24, wherein said screen image pattern comprises a line.

27. A screen apparatus according to claim 25, wherein said edge is formed radially.

28. A screen apparatus according to claim 25, wherein said screen plates are placed at different positions along the optical axis of said forming means.

29. A screen apparatus according to claim 21, wherein said screen elements are mounted for rotation.

30. A screen apparatus according to claim 29, wherein each said screen element is a sector fixed on a rotating axis and each sector angle is substantiality 360°/n, where n is a number of screen elements.

31. A screen apparatus according to claim 30, wherein a radius of a said screen element is proportional to a distance from said screen element to said optical system.

32. A screen apparatus according to claim 29, wherein a center of rotation coincides with an optical axis of said optical system.

33. A screen apparatus according to claim 29, wherein a center of rotation is spaced from an optical axis of said optical system.

34. A screen apparatus according to claim 21, wherein said screen element image formed on said plane of observation occupies approximately 30 percent or less of an area of said plane.

35. An optical focus evaluation method comprising;
   positioning one or more screen elements at different object distances of an optical system;
   forming an image of each said screen element on a light receiving means positioned at an assumed focal plane of said optical system; and
   calculating an evaluation value for each said image of each said screen element formed on said light receiving means in relation to a predetermined objective value for each said image of each said screen element formed on said light receiving means.

36. An optical focus evaluation method according to claim 35, further comprising considering said evaluation value of a screen element positioned at a far distance more than the evaluation value of a screen element positioned at a close distance.

37. An optical focus evaluation method according to claim 35, further comprising considering said evaluation value of a screen element positioned at a close distance more than the evaluation value of a screen element positioned at a far distance.

38. An optical focus evaluation method according to claim 35, further comprising positioning an intermediate screen element between a far object distance screen element and a close object distance screen element, such that a predetermined objective value of said intermediate screen element is less than respective predetermined objective values of each of said far and close object distance screen elements.

39. An optical focus evaluation method according to claim 35, further comprising relating said predetermined objective value and said evaluation value to a measure of an out-of-focus image for each said screen element formed on said light receiving means.

40. An optical focus evaluation method according to claim 39, further comprising defining said measure of an out-of-focus image by different predetermined objective values for each image of each said screen element, each said screen element comprising a plurality of components and each said screen element being positioned at a plurality of object distances.

41. An optical focus adjustment method comprising:
placing at least one screen element at different objective distances of an optical system being examined;
forming an image of said at least one screen element on a light receiving means positioned in an assumed focal plane of said optical system;
computing an evaluation value of an image of said at least one screen element formed on said light receiving means in relation to a predetermined objective value of said at least one screen element image formed on said light receiving means; and,
adjusting a focus point of said optical system being examined based on said predetermined objective value and said computed evaluation value.

42. An optical focus method according to claim 41, further comprising considering said evaluation value of said at least one screen element positioned at a far objective distance more than said evaluation value of said at least one screen element positioned at a close objective distance.

43. An optical focus adjustment method according to claim 41, further comprising considering said evaluation value of said at least one screen element positioned at a close objective distance more than said evaluation value of said at least one screen element positioned at a far objective distance.

44. An optical focus adjustment method according to claim 41, further comprising positioning an intermediate screen element between a far objective distance screen element and a close objective distance screen element, such that a predetermined objective value of said intermediate screen element is less than respective predetermined objective values of said far and close distance screen elements.

45. An optical focus adjustment method according to claim 41, further comprising relating said predetermined objective value and said evaluation value to a quantity of an out-of-focus image for said at least one screen element formed on said light receiving means.

46. An optical focus adjustment method according to claim 45, further comprising defining said out-of-focus image quantities for different predetermined objective values for said at least one image of each said screen element, each said screen element comprising a plurality of components and said at least one screen element being positioned at plurality of object distances.

47. A focus evaluation method whereby an image sharpness of an optical image forming system is evaluated comprising:

converting images of more than N number of screen elements, where N is an integer larger than 2, positioned within a specific region on both sides of a best focus object position of the optical image forming system being examined into electrical data;
computing evaluation values, yn, where n=1 to N, of image sharpness for each said screen element based on said electrical data; and,
computing an actual overall evaluation value "S" by the mathematical function:

$$S = g(y1, y2, \ldots, yn, \ldots, yN)$$

from said N number of evaluation values yn.

48. A focus evaluation method according to claim 47, comprising:
comparing said actual overall evaluation value "S" with a predetermined standard overall evaluation value "$S_0$".

49. A focus evaluation method according to claim 48, further comprising: varying a focusing condition based on said compared values.

50. A focus evaluation method comprising;
converting images, formed by an optical system under examination, of a screen element located at a distance closer than an expected best focus object distance, of a screen element located at a distance, further than an expected best focus object distance, and of an intermediate screen element located between said two screen elements into electrical data;
computing evaluation values y1, y2 and y3 of image sharpness for each said screen element based on said electrical data; and,
computing an actual overall evaluation value "S" by a mathematical function $$S=g(y1, y2, y3)$$

from said evaluation values y1, y2 and y3.

51. A focus evaluation method according to claim 50, further comprising, comparing said actual overall evaluation value "S" with a predetermined standard overall evaluation value "$S_0$".

52. A focus evaluation method according to claim 50, wherein said mathematical function "g" is expressed by the formula:

$$(y1-y2)/(y2-y3).$$

53. A focus evaluation method according to claim 50, wherein said mathematical function "g" is expressed by the formula:

$$(y2-y3)/(y1-y2).$$

54. A focus evaluation method according to claim 50, wherein said mathematical function "g" is expressed by the formula:

$$(y3/y2)-(y2/y1).$$

55. A focus adjustment method comprising:
converting images, formed by an optical system being examined, of more than N number of screen means, wherein N is an integer larger than two, positioned within a predetermined region on both sides of a best focus object distance into electrical data;
computing evaluation values yn n=1 to N of image sharpness for each said screen element based on said electrical data;

varying a focusing condition by a quantitative unit x of a focus adjustment;

expressing focus evaluation values "yn" in a form of a mathematical function:

$$yn=fn(x)$$

where x is said quantitative unit of said focus adjustment;

computing an actual overall evaluation value "S" by a mathematical function:

$$S = g(y1, y2, \ldots, yn, \ldots, yN)$$

and, computing a focus adjustment objective value $x_0$ which satisfies a predetermined standard overall evaluation value "$S_0$" from said mathematical functions "fn" and "g", and, said focus adjustment objective value $x_0$ further satisfies said focus evaluation values "yn" and said actual overall evaluation value "S".

56. A focus adjustment method according to claim 55, further comprising computing said focus adjustment objective value $x_0$ which satisfies said standard overall evaluation value "$S_0$" by f'n (x) obtained by a linear approximation of said mathematical function fn(x).

57. A focusing adjustment method comprising;

converting a plurality of images, formed by an optical system being examined, of a screen element located at a distance closer than an expected best focus object distance, of a screen element located at a distance further than an expected best focus object distance, and of an intermediate screen element located between said two screen elements into electrical data;

computing evaluation values y1, y2 and y3 of image sharpness for each said screen element based on said electrical data;

varying a focus condition by a focus adjustment quantitative unit x;

expressing said evaluation values y1, y2 and y3 by a mathematical function of a focus adjustment quantitative unit x, given by the following equations:

$$y1=f1(x)$$
$$y2=f2(x)$$
$$y3=f3(x),$$

computing an actual overall evaluation value "S" by the formula:

$$S=g(y1, y2, y3)$$

based on said evaluation values y1, y2 and y3; and, computing a focus adjustment objective value $x_0$ which satisfies said standard overall evaluation value "$S_0$" based on said mathematical functions f1, f2, f3 and "g", said evaluation values y1, y2 and y3 and said actual overall evaluation value "S".

58. A focus adjustment method according to claim 57, further comprising;

computing a focus adjustment objective value $x_0$ which satisfies said standard overall evaluation value "$S_0$" by the mathematical functions f'1(x), f'2(x), and f'3(x) obtained by a linear approximation of said mathematical function f1(x), f2(x) and f3(x).

59. A focus adjustment method according to claim 57, wherein said mathematical function "g" is expressed by the formula:

$$g=(y1-y2)/(y2-y3).$$

60. A focus adjustment method according to claim 57, wherein said mathematical function "g" is expressed by the formula:

$$g=(y2-y3)/(y1-y2).$$

61. A focus adjustment method according to claim 57, wherein said mathematical function g is expressed by a formula;

$$g=y3/y2-y2/y1.$$

62. A focus evaluation apparatus comprising;

N number of screen element means, wherein N is an integer larger than two, positioned within a specific region on both sides of a best focus object distance of an optical system being examined;

means for converting images of each said screen element means formed by said optical system being examined into electrical data; and, computing means for computing evaluation values yn, n=1 to N, of image sharpness of each said screen element means based on said electrical data, and computing an actual overall evaluation value "S" by the mathematical function:

$$S = g(y1, y2, \ldots, yn, \ldots, yN).$$

63. An optical focus evaluation method comprising:

forming an edge image through an optical system under evaluation on light receiving means;

sampling a distribution of light intensity for an image formed on said light receiving means in a direction substantially perpendicular to said edge image;

calculating a line spread function by differentiating said distribution of light intensity in a sampling direction; and calculating a plurality of edge image evaluation values based on said line spread function, wherein said plurality of evaluation values comprise a calculated standard deviation of said line spread function.

* * * * *